(12) United States Patent
Walkingshaw et al.

(10) Patent No.: US 11,824,355 B2
(45) Date of Patent: Nov. 21, 2023

(54) MECHANICAL-ENERGY STORAGE UNIT

(71) Applicant: Torus Inc., Sandy, UT (US)

(72) Inventors: Nathan Walkingshaw, Sandy, UT (US); Calab Nelson, Sandy, UT (US); Tanner Bean, Sandy, UT (US); Cliff Lambarth, Sandy, UT (US); Jason Eichorst, Sandy, UT (US)

(73) Assignee: Torus Inc., Sandy, UT (US)

( * ) Notice: Subject to any disclaimer, the term of this patent is extended or adjusted under 35 U.S.C. 154(b) by 0 days.

(21) Appl. No.: 18/163,186

(22) Filed: Feb. 1, 2023

(65) Prior Publication Data
US 2023/0246481 A1 Aug. 3, 2023

Related U.S. Application Data

(60) Provisional application No. 63/305,273, filed on Feb. 1, 2022.

(51) Int. Cl.
| | | |
|---|---|---|
| *H02K 15/00* | (2006.01) | |
| *H02J 15/00* | (2006.01) | |
| *H02K 7/09* | (2006.01) | |
| *H02K 7/00* | (2006.01) | |
| *H02K 1/27* | (2022.01) | |
| *H02K 7/02* | (2006.01) | |

(52) U.S. Cl.
CPC .............. *H02J 15/007* (2020.01); *H02K 1/27* (2013.01); *H02K 7/003* (2013.01); *H02K 7/025* (2013.01); *H02K 7/09* (2013.01)

(58) Field of Classification Search
CPC ......... H02J 15/007; H02K 1/27; H02K 7/003; H02K 7/025; H02K 7/09
USPC .......................................................... 700/295
See application file for complete search history.

(56) References Cited

U.S. PATENT DOCUMENTS

| | | | | |
|---|---|---|---|---|
| 2012/0176074 | A1* | 7/2012 | Dubois | .................. H02J 9/066 318/540 |
| 2016/0178031 | A1* | 6/2016 | Pullen | ..................... B60L 50/30 74/572.11 |

FOREIGN PATENT DOCUMENTS

JP 2007056710 * 3/2007 ............. F01D 25/00

OTHER PUBLICATIONS

Machine translation of JP2007056710; Nakaseki et al. (Year: 2007).*

(Continued)

*Primary Examiner* — Terrance L Kenerly
(74) *Attorney, Agent, or Firm* — VLP Law Group LLP; Michel Bohn

(57) ABSTRACT

A system may include a flywheel including one or more plates and coupled at a central axis of rotation to a flywheel bearing, the flywheel being adapted to rotate about the central axis. A system may include a flywheel housing providing vertical support to the flywheel bearing. A system may include the flywheel bearing coupling the flywheel to the flywheel housing. A system may include a motor assembly including a motor adapted to convert an input electrical current to rotational momentum by spinning up the flywheel, the motor further being adapted to convert the rotational momentum of the flywheel into an output electrical current. A system may include a flywheel coupling adapted to couple the motor assembly with the flywheel and impart rotational force between the motor and the flywheel.

20 Claims, 14 Drawing Sheets

(56) References Cited

OTHER PUBLICATIONS

Kim, Seong J., et al., Design and fabrication of hybrid composite hub for multi-rim flywheel energy storage system, Composite Structures 107, 2014, pp. 19-29.

Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.

Ha, Sung K., et al., Design and Spin Test of Hybrid Composite Flywheel Rotor with Split Type Hub, Journal of Composite Materials, Jan. 9, 2006, SAGE Publications, pp. 1-18.

Ertz, Gabriel, Development, manufacturing, and testing of a multi-rim (hybrid) flywheel rotor, Diploma Thesis University of Alberta, Institute For Dynamics and Vibration, Jun. 10, 2014, 107 pages.

\* cited by examiner

MECHANICAL-ENERGY STORAGE UNIT

BACKGROUND

The present disclosure relates to mechanical-energy storage units. Implementations relate to flywheel-based mechanical-energy storage units.

Currently, residential electricity customers, as well as electrical utilities, use various sources of electrical energy storage to offset varying electrical power production and use, such as the duck curve describing varying electrical demand on a grid over a day associated with solar or other renewable energy production. The variation in power production and usage has been further exacerbated with the increasing popularity of renewable power sources. These issues cause significant cost and other issues to utilities, such as power outages, brown outs, increased costs, decreased predictability, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans where the batteries have a limited number of years and recharge cycles before they must be disposed of. For instance, in instances where they are being charged and discharged frequently, such as on a daily basis, they may need to be replaced within just a few short years.

Previous solutions for mechanical energy storage have been overly complex, too large to be implemented at a residential level, not scalable for an electrical utility, lacking safeguards, not adapted for mass production or have faced other issues.

SUMMARY

In some aspects, the techniques described herein relate to a mechanical-energy storage unit assembly including: a flywheel including one or more plates and coupled at a central axis of rotation to a flywheel bearing, the flywheel being adapted to rotate about the central axis; a flywheel housing providing vertical support to the flywheel bearing; the flywheel bearing coupling the flywheel to the flywheel housing; a motor assembly including a motor adapted to convert an input electrical current to rotational momentum by spinning up the flywheel, the motor further being adapted to convert the rotational momentum of the flywheel into an output electrical current; and a flywheel coupling adapted to couple the motor assembly with the flywheel and impart rotational force between the motor and the flywheel.

In some aspects, the techniques described herein relate to a mechanical-energy storage unit assembly, wherein: the one or more plates include a plurality of metal plates stacked together.

In some aspects, the techniques described herein relate to a mechanical-energy storage unit assembly, wherein: the flywheel includes a plurality of bolts that rotate around the central axis with the plurality of metal plates; and the plurality of bolts adapted to provide compressive force on the plurality of metal plates, the compressive force increasing friction between the plurality of metal plates.

In some aspects, the techniques described herein relate to a mechanical-energy storage unit assembly, wherein: the flywheel housing includes a top structure, a bottom structure, and one or more support members coupling the top structure and the bottom structure together and providing a cavity between the top structure and the bottom structure, the flywheel being located in the cavity when housed by the flywheel housing; the flywheel bearing is coupled with one or more of the top structure and the bottom structure; and the flywheel housing includes one or more bushings coupling the flywheel housing to an external structure.

In some aspects, the techniques described herein relate to a mechanical-energy storage unit assembly, wherein: a rotor of the motor is located at the central axis and coupled with the flywheel coupling to rotate with the flywheel.

In some aspects, the techniques described herein relate to a mechanical-energy storage unit assembly, wherein the flywheel coupling imparting the rotational force between the motor and the flywheel includes: a plurality of magnets arranged circumferentially around the central axis, the flywheel coupling being adapted to allow the flywheel to be mechanically decoupled from the motor while the flywheel coupling is imparting the rotational force.

In some aspects, the techniques described herein relate to a mechanical-energy storage unit assembly, wherein: the flywheel coupling includes a flywheel component coupled with the flywheel and a motor component coupled with the motor, the flywheel component interacting with the motor component using magnetic flux to impart force on the motor component; the flywheel component includes a first plurality of magnets in the flywheel component and located radially relative to the central axis; and the motor component includes a second plurality of magnets in the motor component and located radially relative to the central axis.

In some aspects, the techniques described herein relate to a mechanical-energy storage unit assembly, further including: the first plurality of magnets are polarized in a radial direction outward from the central axis, a magnetic moment of each of the first plurality of magnets being oriented in an alternating direction from an adjacent magnet of the first plurality of magnets; and the second plurality of magnets are polarized in the radial direction outward from the central axis, a magnetic moment of each of the second plurality of magnets being oriented in an alternating direction from an adjacent magnet of the second plurality of magnets.

In some aspects, the techniques described herein relate to a mechanical-energy storage unit assembly, wherein: the flywheel coupling is connected to a control unit, the control unit electronically decoupling the flywheel coupling based on a received electronic signal.

In some aspects, the techniques described herein relate to a mechanical-energy storage unit assembly, wherein: the flywheel coupling is coupled with one or more linear actuators, the one or more linear actuators adapted to decouple the flywheel coupling by lifting a motor component of the flywheel coupling away from a flywheel component of the flywheel coupling.

In some aspects, the techniques described herein relate to a mechanical-energy storage unit assembly, wherein: the one or more linear actuators are further adapted to decouple the flywheel coupling by lifting the motor away from the flywheel component of the flywheel coupling.

In some aspects, the techniques described herein relate to a mechanical-energy storage unit assembly, wherein: the flywheel bearing includes: one or more magnets that magnetically levitate the flywheel vertically; and one or more ball bearings that position the flywheel horizontally.

In some aspects, the techniques described herein relate to a mechanical-energy storage unit assembly, wherein: the flywheel housing includes a vacuum chamber, the flywheel being located within the vacuum chamber.

In some aspects, the techniques described herein relate to a mechanical-energy storage unit assembly, wherein: the motor assembly includes a frame coupling the motor to the flywheel housing and adapted to support the motor along the central axis from the flywheel coupling.

In some aspects, the techniques described herein relate to a mechanical-energy storage unit assembly, wherein: the flywheel bearing includes a plurality of adjustment mechanisms adapted to adjust one or more magnets of a magnetic levitation bearing.

In some aspects, the techniques described herein relate to a mechanical-energy storage unit assembly, further including a mechanical-energy storage unit control system coupled with the motor and the flywheel coupling, the mechanical-energy storage unit control system including one or more processors adapted to execute instructions that cause the mechanical-energy storage unit assembly to: receiving a first electronic message instructing the mechanical-energy storage unit assembly to store power; driving the flywheel including spinning up the flywheel using the motor and an input current based on the first electronic message, the flywheel including a plurality of metal plates coupled with a motor using the flywheel coupling; allowing the flywheel to spin for a defined time period; receiving a second electronic message instructing the mechanical-energy storage unit control system to output power; and outputting an electrical current including driving the motor using the flywheel via the flywheel coupling based on the second electronic message.

In some aspects, the techniques described herein relate to a computer-implemented method for controlling a mechanical-energy storage unit including: receiving, by one or more processors, a first electronic message instructing the mechanical-energy storage unit to store power; driving, by the one or more processors, a flywheel of the mechanical-energy storage unit including spinning up the flywheel using a motor and an input current based on the first electronic message, the flywheel including a plurality of metal plates coupled with a motor using a flywheel coupling; allowing, by the one or more processors, the flywheel to spin for a defined time period; receiving, by the one or more processors, a second electronic message instructing the mechanical-energy storage unit to output power; and outputting, by the one or more processors, an electrical current including driving the motor using the flywheel via the flywheel coupling based on the second electronic message.

In some aspects, the techniques described herein relate to a computer-implemented method, further including: receiving, by the one or more processors, a third electronic message instructing the mechanical-energy storage unit to allow the flywheel to spin; and based on the third electronic message, decoupling, by the one or more processors, the motor from the flywheel using the flywheel coupling.

In some aspects, the techniques described herein relate to a computer-implemented method, wherein: decoupling the motor from the flywheel includes actuating a linear actuator to move a motor component of the flywheel coupling away from a flywheel component of the flywheel coupling.

In some aspects, the techniques described herein relate to a system including: a flywheel including one or more plates and coupled at a central axis of rotation to means for allowing the flywheel to rotate about the central axis; a flywheel housing providing support to the means for allowing the flywheel to rotate about the central axis; means for converting an input electrical current to rotational momentum by spinning up the flywheel; means for converting the rotational momentum of the flywheel to an output electrical current; and means for coupling the flywheel to one or more of the means for converting the input electrical current to the rotational momentum and the means for converting the rotational momentum of the flywheel to the output electrical current.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
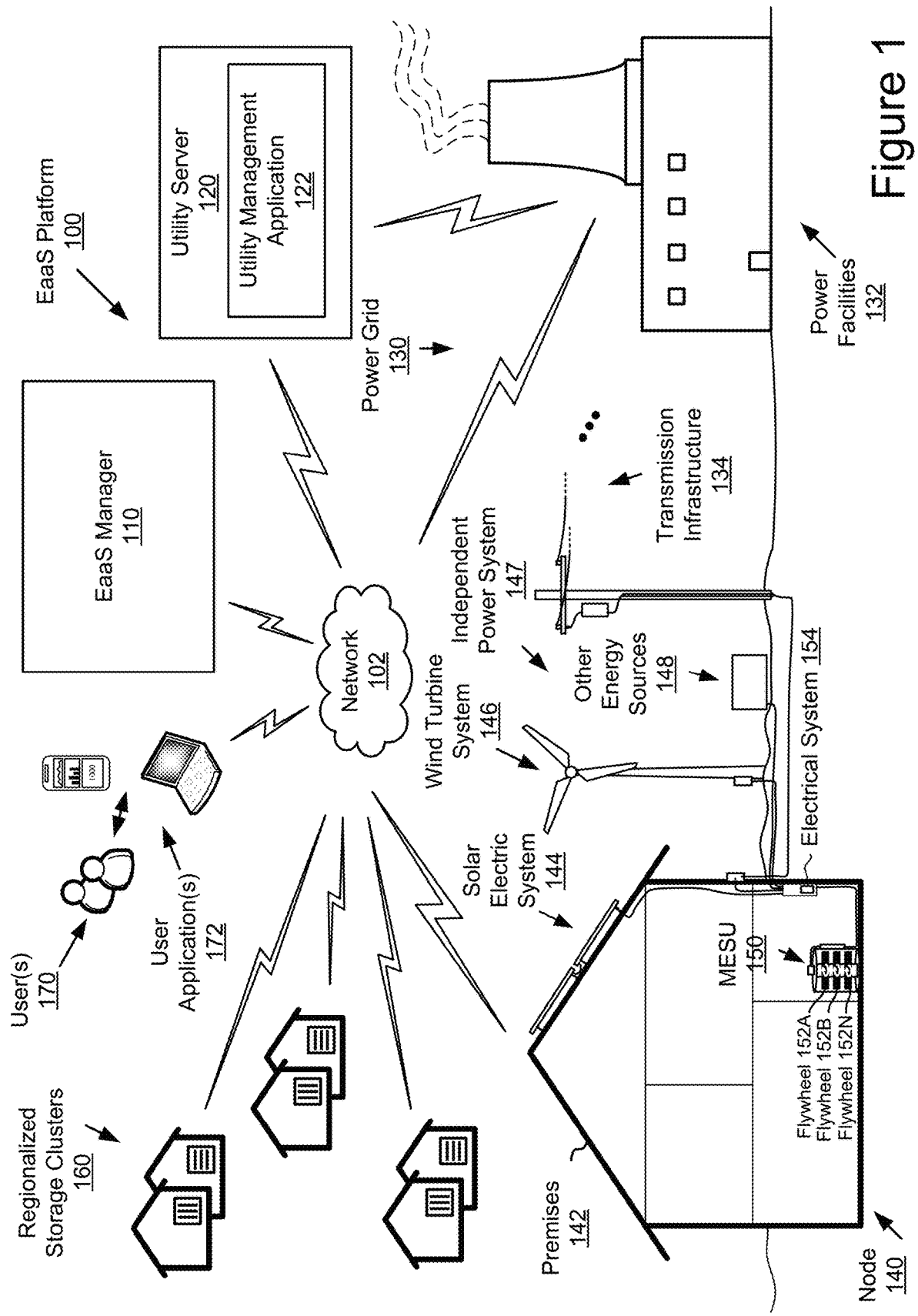
FIG. 1 includes a block diagram depicting an example energy control platform.

This description includes several improvements over previous solutions, such as those described in reference to the Background. A mechanical-energy storage unit is described herein along with operations to integrate the mechanical-energy storage with an electrical utility provider.

In some implementations, one, two, or more mechanical-energy storage units may be installed at a residence to provide backup power in case of a power outage, to store electricity generated using residential solar panels, or to offset unevenness of power production and usage (e.g., an electrical utility may control the mechanical-energy storage unit at a residence to address the unevenness at the residence, nearby residences, or across the power grid. A mechanical-energy storage unit may be buried next to an electrical panel or placed in a shed outside a residence, placed in a garage or utility room, or stored offsite.

In some implementations, multiple mechanical-energy storage units may coupled together to scale energy backup at a larger facility, such as a business, or by an electrical utility. For instance, many mechanical-energy storage units may be placed at a facility, whether buried or above ground for use by the facility or by an electrical utility provider. The multiple mechanical-energy storage units may include or be coupled to MESU (mechanical energy storage unit) control units that may be communicatively linked to each other or to a central server to control storage and distribution of the stored energy (e.g., by controlling the rotational frequency of a flywheel to keep various flywheels at efficient speeds).

In some implementations, the mechanical-energy storage unit may be based on a flywheel, as described in further detail in reference to the figures herein.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

The innovative energy technology disclosed in this document provides novel advantages including the ability to integrate modern technology with conventional power infrastructure; enable rapid transition to renewable energy sources; provide backup to the power grid, use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

The innovative energy technology disclosed in this document provides novel advantages including the ability to integrate modern technology with conventional power infrastructure; enable rapid transition to renewable energy sources; use the power grid 130 as a backup; store power locally in nodes and regionalized storage clusters 160 of node(s) 140; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

As depicted in FIG. 1, the innovative energy technology described herein may comprise an energy as a service platform (EaaS platform) 100. The EaaS platform 100 may include an EaaS manager 110, user application(s) 172 operable on computing devices accessible to and interactable by user(s) 170 of the EaaS platform 100 and configured to send or receive data to the EaaS manager 110, regionalized storage clusters 160 comprised of one or more nodes 140, and the power grid 130 that comprises one or more power facilities 132 that are connected to a power transmission infrastructure 134.

A node 140 may be comprised of a power consuming entity and at least one MESU 150. A node 140 may be an entity that either consumers power itself or is coupled to entities that consumer power. In FIG. 1, a node 140 is depicted as a premises 142, such as a residential home, but it should be understood that any entity that consumes power is applicable, such as one or more appliances, a commercial structure such as a warehouse or office building, an electronic device or system (whether configured to move or static), a transportation system and/or vehicle, a transportation charging system, a power supply, a power substation, a power substation backup, etc. A regionalized storage cluster includes two or more nodes 140 in a given geographical region. A storage cluster may provide power banking functionality, as discussed further herein. The elements of the node 140 including the MESU(s) 150, the independent power system 147, the power grid 130, and/or any appliances and/or other entities, may be electrically coupled via an electrical system 154 including wiring, junctions, switches, plugs, breakers, transformers, inverters, controllers, and any other suitable electrical componentry.

In the depicted example, a node 140 is equipped with or coupled to power generating technology, such as an independent power system 147 and/or the power grid 130. The independent power system 147 may comprise power generating technology that is localized and that allows for independent power generation, such as renewable power generating technology. Non-limiting examples include a solar electric system 144 (comprising a solar array, controllers, inverters, etc.), a wind turbine system 146 (comprising turbine(s), controllers, inverters, etc.), and/or other energy sources 148, such as hydropower, geothermal, nuclear, systems and their constituent components, etc. The power generating technology may additionally or alternatively be conventional carbon-based power generating technology such as the depicted power grid 130, although for carbon negative or neutral implementation, a greener power generating technology may be preferred.

The node 140 may include or be coupled to an energy storage unit that is capable of storing any excess power that is produced by the power generating technology. In some implementations, the energy storage unit may comprise a mechanical-energy storage unit (MESU) 150. The MESU 150 includes one or more flywheels 152A, 152B . . . 152N (also simply referred to individually or collectively as 152). The MESU's 150 convert the electricity received from the power generating technology to kinetic energy by spinning up (increasing the spin rate) of the flywheels 152.

Each flywheel 152 may be configured to store up to a certain maximum about of energy. By way of non-limiting example, a motor 310 coupled to the flywheel 152 may be configured to spin the flywheel 152 up to between 15,000 rotations per minute (RPM) and 25,000 RPM, such that the flywheel 152 may store between 18 kilowatt hours (kWh) and 28 kWh of electricity. Combined, three stacked flywheels 152 could store between 54 kWh and 84 kWh of power. During hours in which the power generation technology, such as the solar cells, produce less power than what is consumed by the electrical apparatuses (e.g., appliances) of the premises 142, the motor 310 may be operated as a generator that converts the kinetic (mechanical) energy stored in the flywheel 152 to electricity, thereby pulling power from the flywheel 152 to meet the local power needs of the node 140 (e.g., power the electrical apparatuses of the premises 142). In this example, advantageously the node 140 may use an average of 15 kWh of power daily and the MESU 150 is capable of powering the node 140 fully for about 4-6 days should the local power generating cease to produce any power.

In another example, as discussed further elsewhere herein, a utility may be integrated with the EaaS manager 110 and its utility management application 122 signal the power management application 111 via the storage cluster APIs 112 that it is experiencing a surge in demand for power, and the power management application 111 may signal a node 140 or cluster of nodes 140 (e.g., storage cluster 160) to spin off power from the flywheels 152 and provide the energy back to the grid through the transmission infrastructure 134, which may be connected to the node(s) 140 through connection points (e.g., two or three phase electrical service drops or buried power lines connected to a service panel, which typically includes power meter(s)). Conversely, the utility may be producing excess power and may wish to bank/store the power. The utility management application 122 may signal the power management application 111 via the storage cluster APIs 112 that it needs to store a given amount of power, and the power management application 111 may in turn signal a node 140 or cluster(s) of node(s) 140, such as one or more regionalized storage clusters 160 to inform them of the storage need, and node(s) 140 in those storage cluster(s) 160 that have excess capacity and are configured to receive power from the grid may receive the power through the transmission infrastructure 134 and store it as mechanical energy in the MESUs for later retrieval. The EaaS platform 100 may charge the utility for the power banking service, as discussed further elsewhere herein.

It should be understood that the RPMs and kWh figures provided in the prior paragraph are meant as non-limiting examples and that the MESU's 150 may be configured with flywheels 152 that are capable of storing more or less power depending on the implementation. For example, the weight of the flywheels 152, the materials used for the flywheels 152, the size and configuration of the flywheels 152, the efficiency of the motor 310 and bearings, and so forth, may all be adjusted based on the use case to provide a desired about of back-up power for the node 140. By way of further example, a flywheel 152 may be made of steel, aluminum, carbon fiber, titanium, any suitable alloy, and/or any other material that is capable of handling the cycles, vibration, radial and sheer stress and strain, and other conditions to which such a flywheel 152 would be subjected.

The power transmission infrastructure 134 comprises a power network that couples power-consuming entities, such as homes, offices, appliances, etc., to power facilities that generate power from carbon, nuclear, and/or natural sources. The transmission infrastructure 134 may include intervening elements, such as step-up transformers, substations, transmission lines, and so forth, which are interconnected to provide power widely to different geographical regions.

A power utility (also simply referred to as a utility), which may own and operate one or more power facilities and portions of the transmission infrastructure 134, may operate a utility server configured to execute a utility management application 122. The utility management application 122 may perform various functions such as load balancing, load managing, and grid energy storage, to manage the supply of electricity based on real-time demand. However, given the limitations of existing grid technologies, power outages, brownouts, and expensive peak power costs are still the norm.

A user may use an instance of a user application 172 executing on a computing device, such as the user's mobile phone or personal computer, to configure and interact with the MESU(s) 150 that they are authorized to control, such as a MESU 150 installed at their home or business, as discussed further elsewhere herein.

As shown in FIG. 1, the EaaS manager 110, the utility server 120, the power facilities 132, elements of the power grid 130, the wind turbine system 146, the solar electric system 144, the other sources 148, the node(s) 140, the regionalized storage clusters 160, the user applications 172 and associated computing devices, etc., may be coupled for communication and connected to the network 102 via wireless or wired connections (using network interfaces associated with the computing devices of the foregoing elements). The network 102 may include any number of networks and/or network types. For example, the network 102 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The EaaS manager 110, the utility server 120, the node(s) 140, the power facilities, and the user devices may have computer processors, memory, and other elements providing them with non-transitory data processing, storing, and communication capabilities. For example, each of the foregoing elements may include one or more hardware servers, server arrays, storage devices, network interfaces, and/or other computing elements, etc. In some implementations, one or more of the foregoing elements may include one or more virtual servers, which operate in a host server environment. Other variations are also possible and contemplated.

Figure 2:
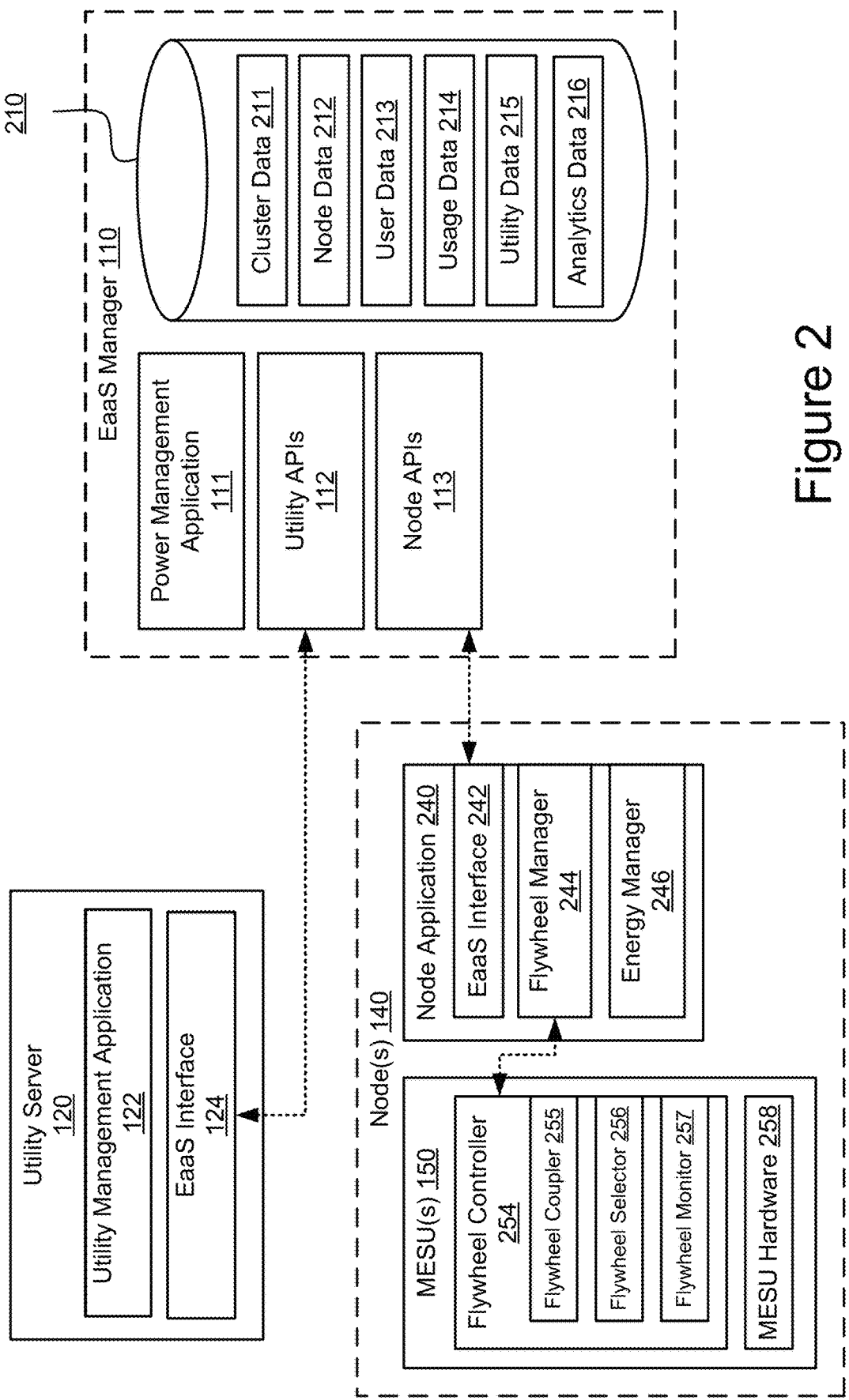
FIG. 2 depicts a block diagram showing example interaction between a utility server, node(s), and EaaS manager.

It should be understood that the EaaS platform 100 illustrated in FIG. 1 and the diagram illustrated in FIG. 2 are representative of example systems and that a variety of different system environments and configurations are contemplated and are within the scope of the present disclosure. For example, various acts and/or functionality may be moved between entities (e.g., from a server to a client, or vice versa, between servers, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc., without departing from the scope of this disclosure.

FIG. 2 depicts a block diagram showing example components of, and the interaction between, the utility server 120, the node(s) 140, and the EaaS manager 110. The utility server includes an instance of the utility management application 122 and an EaaS interface 124. The EaaS manager 110 includes a power management application 111, Utility APIs 112, node APIs 113, MESU APIs 114, and a data store 210. The data store 210 may store and provide access to data related to the EaaS platform 100, such as cluster data 211, node data 212, user data 213, usage data 214, utility data 214, and analytics data 216.

A node 140 of the EaaS platform may include one or more MESU(s) 150. A MESU 150 may include an instance of a flywheel controller 254. The flywheel controller 254 may include a flywheel coupler 255, a flywheel selector 256, and flywheel monitor 257. The MESU hardware 258 may comprise a chassis, one or more flywheels 152, magnets and/or bearings, a flywheel coupler 255, and/or a motor-generator 310. The motor-generator 310 may be coupled to each flywheel 152 via a flywheel coupler 255. The flywheel coupler 255 may engage and disengage the motor-generator 310 from the flywheel 152, such that each flywheel 152 may spin freely when disengaged and may be coupled to the motor-generator 310 when engaged such that the motor-generator 310 may increase the speed of the flywheel 152 (spin up the flywheel 152), or the flywheel 152 may spin the generator to produce power. Each flywheel 152 may be levitated using magnets to minimize the friction caused by the rotation of flywheel 152. As an example, a maglev unit may be used to suspend and retain the flywheel 152 while spinning.

Additionally, or alternatively, bearings, such as but not limited to ceramic bearings, may be used to support and retain the flywheel 152 while spinning. The chassis may house and support the flywheels 152. flywheels 152 may be arranged horizontally or vertically. In horizontal orientation, flywheels 152 may have a wheel-like shape and may be stackable one on another in the same chassis, but still configured to spin independently of one another. In such a configuration, the coupler couple to each flywheel 152 independently, or more than one coupler and motor 310 may be used, depending on the implementation. In a vertical orientation, the flywheels 152 may have a roll like shape, and may be positioned parallel to one another in the chassis. In either orientation, in some implementations, the chassis may include a housing that encloses the MESU 150 and provides a vacuum environment in which the components of the MESU 150 may operate. This is advantageous as it may seal out dirt, debris, and corrosion causing elements, and allow for the flywheels 152 and other components to optimally operate.

In some implementations, a node 140 may include one or more MESU(s) 150 and may act as a manager of the MESU(s), may receive and process information from the EaaS manager 110 for the two or more MESU(s) 150, and may send signals to the MESU(s) 150 (e.g., via the flywheel controller 254 and/or MESU hardware 258) and receive and process signals from the MESU(s) 150 (e.g., via the flywheel controller 254 and/or MESU hardware 258), to control the functionality and operations of the MESU(s). In some further implementations, the structure, acts, and/or functionality of the flywheel controller 254 and the node application 240 and their constituent components may be combined, and the node 140 may represent a MESU(s) 150 itself, to which one or more appliances that consume power may be coupled to receive power. Other variations are also possible and contemplated.

The utility management application 122, the flywheel controller 254, the node application, the node management application, the utility APIs, the node APIs, and the MESU APIs may each include hardware and/or software executable to provide the acts and functionality disclosed herein.

Specifically, the utility management application 122 may be executable by the utility server to monitor power generation and distribution by one or more power facilities and a transmission infrastructure 134. The utility management application 122 may receive signals from various entities of the EaaS platform, such as the EaaS manager 110, the nodes, the transmission infrastructure 134, other utility management applications associated with other providers, and so forth. The utility management application 122 may communicate via the EaaS interface 124 with the EaaS manager 110 to access the services provided by the EaaS manager 110. In particular, the EaaS interface 124 may interact with the utility APIs of the EaaS manager 110 to request power banking, request the provision of supplemental power, to provide usage, performance, and/or demand data, and so forth. In some implementations, the EaaS interface 124 may generate and transmit a secure request via the network to the utility APIs. The power management application 111 may receive the request via the utility APIs and process it accordingly.

The power management application 111 may be coupled to the data store 210 to store and retrieve data. The data stored by the data store 210 may be organized and queried using any type of data stored in the data store (e.g., cluster ID, user ID, utility ID, node ID, MESU ID, configuration data, etc.). The data store 210 may include file systems, databases, data tables, documents, or other organized collections of data.

Cluster data 211 may comprise information about a cluster of two or more nodes (e.g., regionalized storage cluster), such as the identity of the node(s) 140, the storage capacity of the storage cluster 160, the availability of the storage cluster 160, the operational health of the storage cluster 160 and/or constituent MESU(s) 150, the historical performance of the storage cluster 160, etc.).

Node data 212 may comprise information about a node, such as the number of MESUs installed at the node 140, the type of node 140, the operational health of the MESU(s) 150, any restrictions or operation parameters of the MESU(s) 150, configuration data for the MESU(s) 150, identifiers of the MESU(s) 150, who the MESU(s) 150 belong to, whether the MESU(s) 150 can be used for banking grid power, whether the MESU(s) 150 have been inactivated, and so forth.

User data 213 may comprise information about the user associated with a storage cluster 160, node 140 or MESU 150, including user account information, login information, user preferences governing the MESUs (e.g., schedule data, activation/inactivation data, etc.).

Usage data 214 may comprise information about the usage of the clusters and/or MESU(s) 150, such as spin rates of the flywheels 152, power output levels, maintenance periods, downtime, inactive periods, third-party use (e.g., use by utilities or neighboring nodes 140), etc.

Utility data 215 may comprise information about utilities that have partnered with the EaaS platform 100, such as utility account information, utility capability information, power banking requirements, contractual parameters, performance requirements, power grid 130 specifications, etc.

Analytics data 216 may comprise insights about the EaaS platform 100, such as local vs. grid power generation, aggregate usage data, aggregate performance data, etc. It should be understood that any other data that would be suitable and applicable to the EaaS platform 100 may be stored and processed by the EaaS manager 110.

The node application 240 and the flywheel controller 254 may communicate with the EaaS manager 110 via the EaaS interface 242, which is configured to interact with the node APIs 113 surfaced by the EaaS manager 110. The node APIs 113 provide methods for accessing data relevant to the node 140 and the MESU(s) 150 associated with the node 140, and executing various functionality, such as signaling unavailability/availability for banking power, requesting a functional upgrade, such as a higher spin rate for one or more flywheels 152 or deactivating/activating a previously active/inactive flywheel 152, reporting usage data and/or state information, and so forth.

The flywheel manager 244 of the node application 204 may be configured to communicate with the flywheel controller 254 to provide operational control signals, such as power banking signals, power extraction signals, spin rate adjustment signals, flywheel enablement/disablement signals, and so forth. The energy manager 246 is configured to communicate with the flywheel manager 244 and provides controls signals to the flywheel manager depending on the energy requirements (produce energy for local use, produce energy for utility use, bank local energy, bank utility-provided energy, etc.).

The flywheel coupler 255 may be configured to control the mechanical coupling of the flywheels 152 with the motor-generator 310, the flywheel selector 256 is configured to select which flywheels 152 to control based on the received control signals, and the flywheel monitor 257 monitors the state of each flywheel 152 for safe operation and performance within defined operational parameters, and can take control of the functionality of the MESU hardware 258 and shut down, slow, suspend, adjust, optimize, or other control the MESU hardware 258 depending on the monitored state.

Figure 3A:
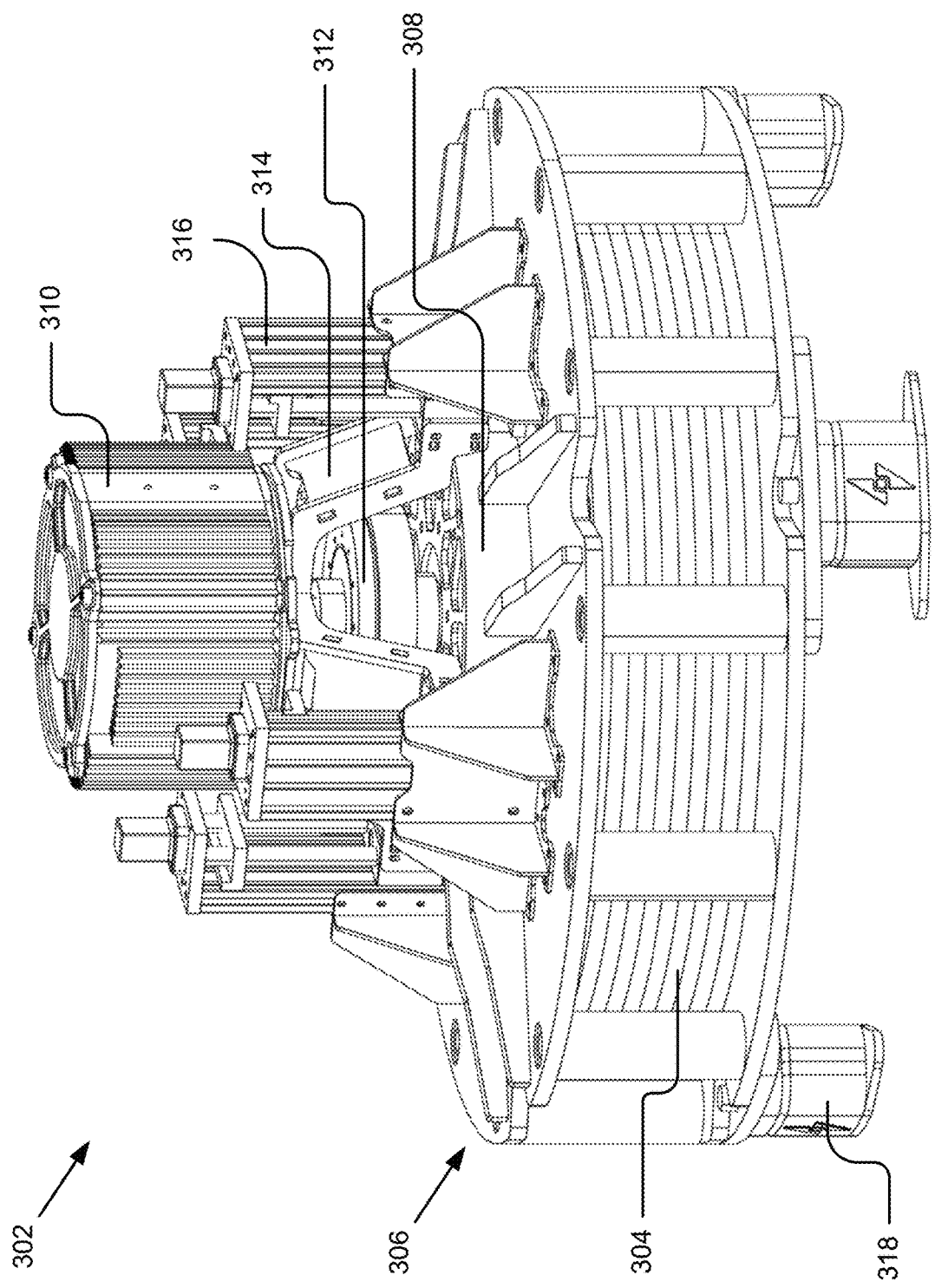
FIGS. 3A and 3B illustrate an example implementation of a mechanical-energy storage unit assembly.
Figure 3B:
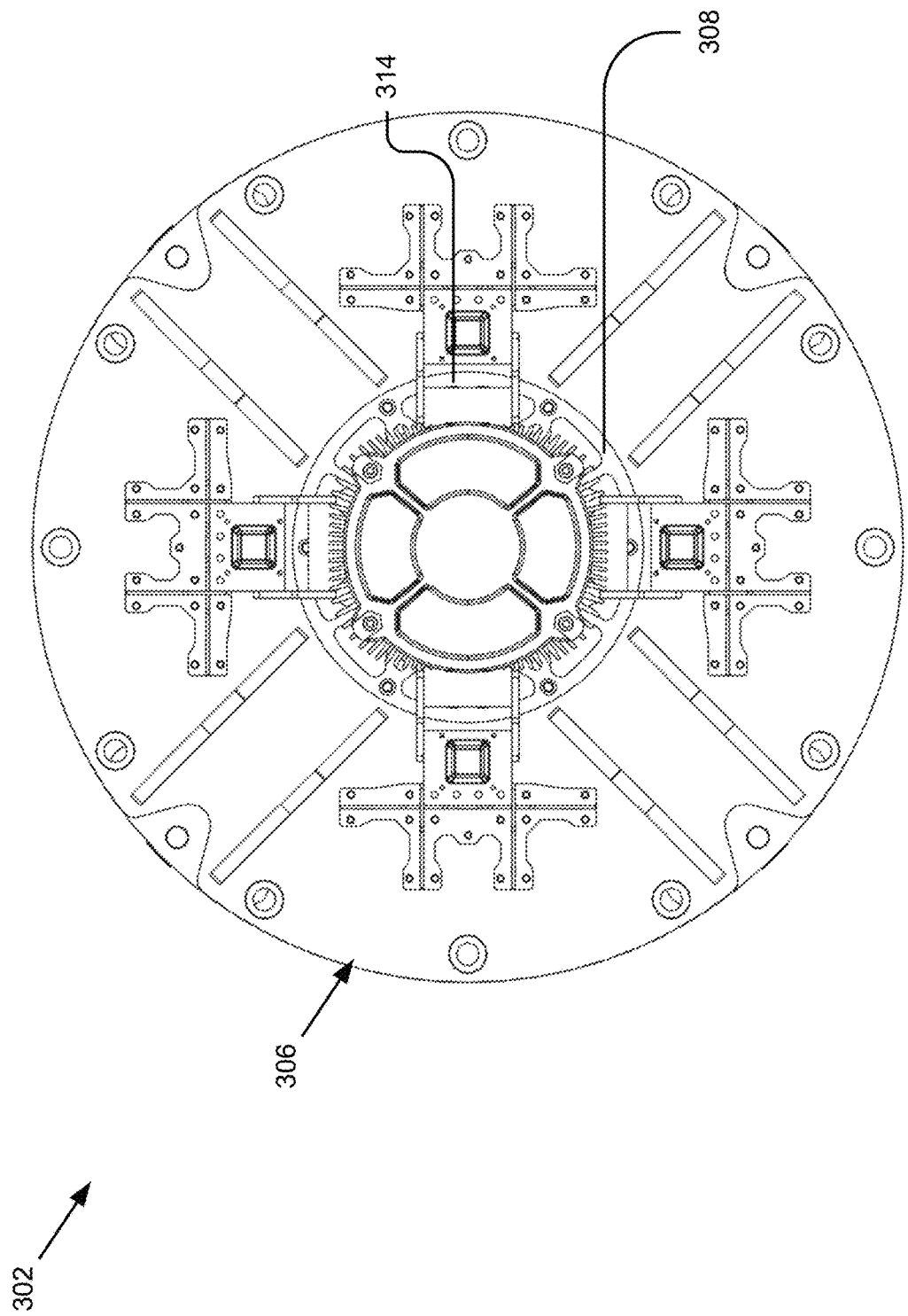

FIGS. 3A and 3B illustrate an example implementation of a mechanical-energy storage unit (MESU) assembly 302 that may use a flywheel 304 to store energy using rotational momentum. FIG. 3A illustrates a perspective view of an example MESU assembly 302 while FIG. 3B illustrates a top-down view of the example MESU assembly 302.

For example, while other implementations are possible and contemplated herein, FIG. 3A illustrates an example mechanical-energy storage unit (MESU) assembly 302, according to some implementations, which uses a flywheel 304 to provide energy storage. As illustrated in the example implementation of FIG. 3A, a MESU assembly 302 may include a flywheel housing 306 providing support to a flywheel bearing 308 that provides support to the flywheel 304. The flywheel bearing 308 may suspend and allow a flywheel 304 to rotate within a cavity or space in the flywheel housing 306, for example, about a central axis of rotation. A motor-generator 310 may be coupled or couplable with the flywheel 304 via a flywheel coupler 312 to exert rotational force thereon or receive rotational force therefrom. In some implementations, the MESU assembly 302 may include various other components, such as frames, actuators, electronics, cases, reinforcements, legs 318, etc., which are described elsewhere herein.

It should be noted that although certain components and configurations are described herein, for example, in reference to FIGS. 3A-3B, other implementations are possible and contemplated herein. For example, a MESU assembly 302 may include fewer, additional, or different components. In some implementations, the MESU assembly 302 may have various other configurations, for example, it may be oriented in various directions, such as where a motor 310 is located below the flywheel 304 or at a side of it, or otherwise.

In some implementations, although not illustrated in the example of FIGS. 3A-3B, the MESU assembly 302 may include other components, such as inverters, wiring, switches, transformers, and/or other power converting or transmission equipment that communicates electrical current from and/or to an external power source, such as an electrical service panel, solar panel system, electrical grid, etc. The equipment may additionally or alternatively couple the MESU assembly 302 to various loads, such as a power grid, electrical service panel, electric vehicle charger, etc.

In some implementations, the MESU assembly 302 may include and/or be coupled with various control equipment, such as a computing device or other control unit that executes various operations, sensors, etc. For example, the MESU assembly 302 may be part of a node 140 and coupled with a flywheel controller 254 and/or node application 240. For example, the MESU assembly 302 control unit may represent an implementation of the flywheel controller or one of its components. The MESU assembly 302 control unit, etc., as described above may perform various operations respective to the MESU assembly 302, such as describe in further detail elsewhere herein.

In some implementations, all or a portion of the MESU assembly 302 may be placed within a case or enclosure to provide protection to the MESU assembly 302, protection from potential flywheel structural failure, and/or a vacuum, which increases flywheel efficiency. For example, a vacuum may be permanent or actively maintained using a vacuum pump. An example enclosure is described in further detail below.

As illustrated in the example of FIGS. 3A-3B, the MESU assembly 302 may include a flywheel 304 including one or more plates coupled at a central axis of rotation to a flywheel bearing 308, which allows the flywheel 304 to rotate about the central axis. The flywheel 304 may be housed within and supported (e.g., by the flywheel bearing 308) by the flywheel housing 306. The MESU assembly 302 may include a motor 310 assembly including a motor 310 adapted to convert an input electrical current to rotational momentum by spinning up the flywheel 304 and/or convert the rotational momentum of the flywheel 304 into an output electrical current. The flywheel 304 may be coupled with the motor 310 using a flywheel coupling 312 that imparts rotational force between the motor 310 and the flywheel 304.

In some instances, the flywheel 304 may be allowed to spin or freewheel relative to the flywheel housing 306, for example by allowing a motor 310 to spin freely and/or allow the flywheel coupling 312 to decouple, as described in further detail below. For example, the MESU assembly 302 may include a motor 310 frame 314 that holds the motor 310 and may allow the motor 310 to be moved, depending on the implementation. Additionally, or alternatively, the MESU assembly 302 may include a coupling lifter 316 or other mechanism that electronically couples and/or decouples the flywheel coupling 312 and/or the motor 310 via the motor frame, as described in the examples below.

Figure 5A:
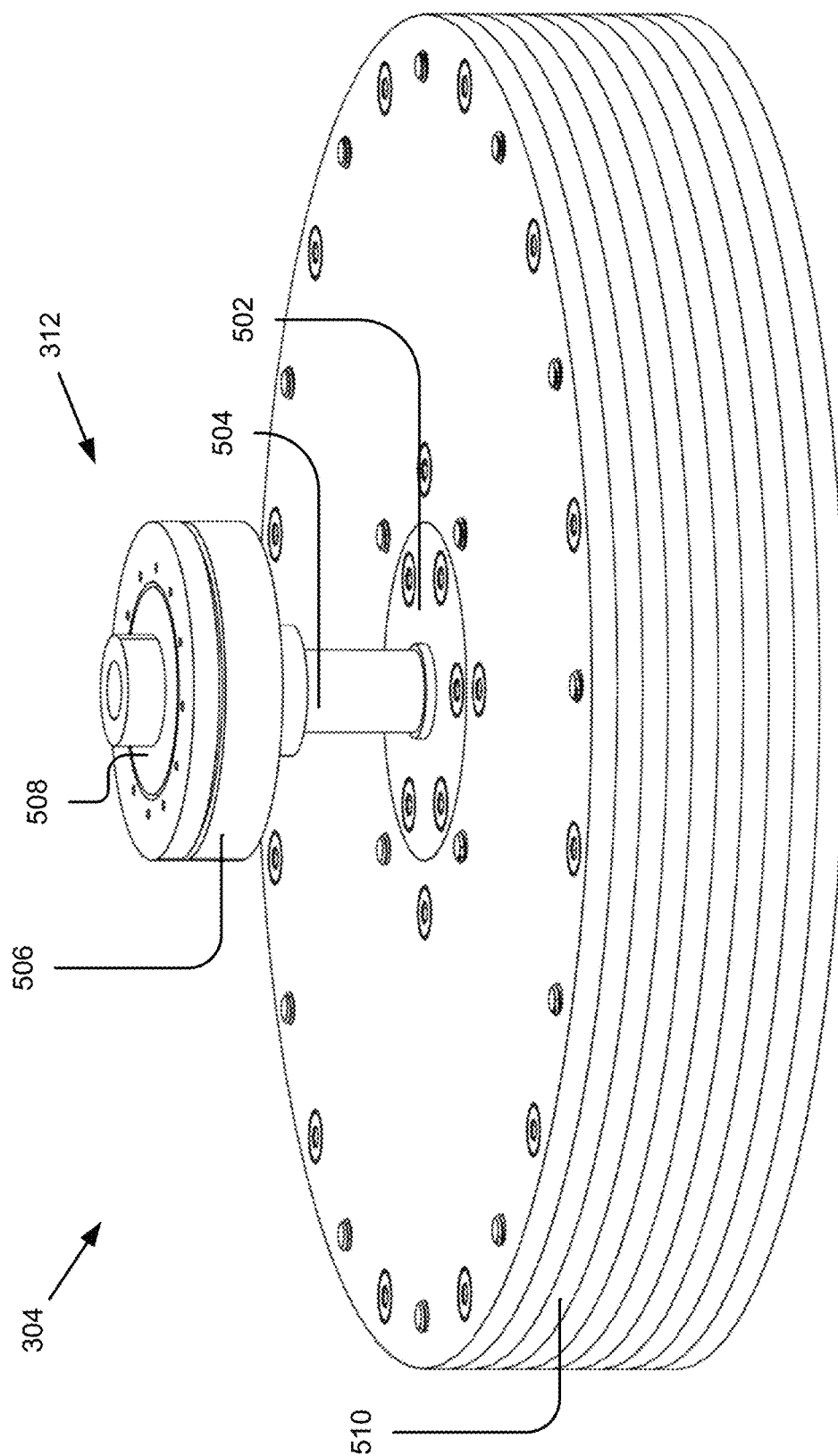
FIGS. 5A and 5B illustrate perspective views of example flywheels.
Figure 5B:
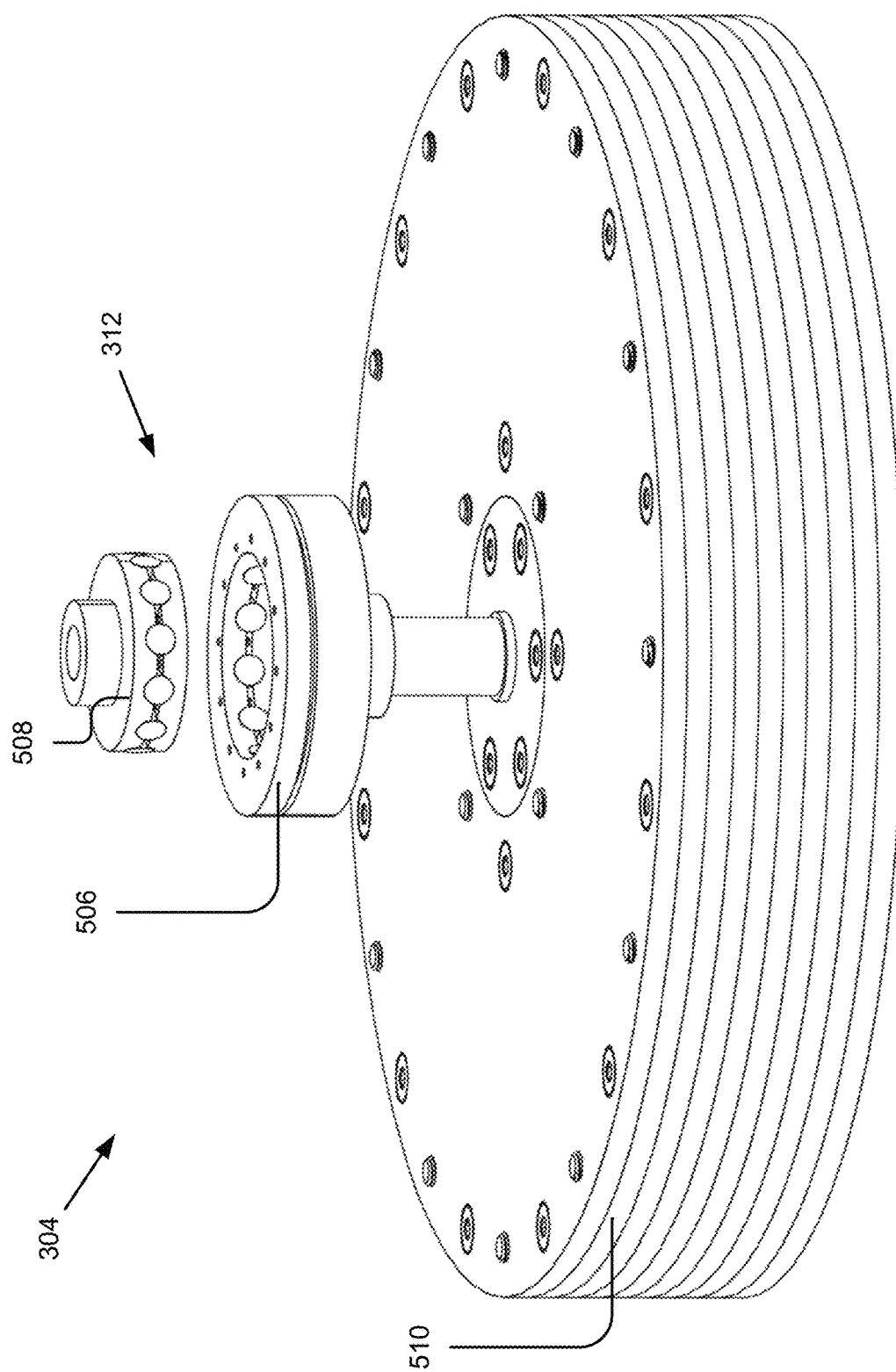

FIGS. 5A and 5B illustrate perspective views of example flywheels 304 according to some implementations. For example, FIG. 5A illustrates an example flywheel 304 with an example flywheel coupling 312 in a coupled position while FIG. 5B illustrates the example flywheel 304 with the example flywheel coupling 312 in a closed position. As illustrated, a flywheel 304 may include a massive wheel that rotates about a central axis. In the example of FIGS. 5A-5B, several metal disks may be used and coupled together, for instance using bolts passing through the disks. In some implementations, the flywheel 304 may include disks, rings, or a solid structure, as describe in further detail below.

In the example, ten flywheel disks 510 are shown; however, other quantities and configurations are possible and contemplated herein. The thicknesses, sizes, shapes, and quantities of the disks or plates may vary. For instance, the number of disks can be varied to adjust the amount of energy storage of a mechanical-energy storage unit where additional disks provide additional storage for a minimum in additional cost and complexity without correspondingly increasing a probability of structural failure. The disks 510 may be solid plates, have various perforations (e.g., for bolts or a hub 502), be circular or other shapes, or have other configurations. Ideally, the disks are symmetrical or otherwise balanced to reduce vibrations when the flywheel 304 is spinning.

Depending on the implementation, the flywheel 304 may be constructed from aluminum, steel, concrete, composite, another material, or a combination thereof. For example, a set of steel flywheel plates or disks coupled together, each of which may be a quarter inch, half inch, inch, or other dimension thick. Other implementations, such as a combination of aluminum and composite (e.g., carbon fiber, etc.) are described in further detail below. In some implementations, the disks may include or be reinforced using other materials, such as Kevlar®, fiberglass, or carbon fiber, as described elsewhere herein.

The flywheel 304 may have various dimensions that based on material strengths of the flywheel 304, desired rotational speeds, and/or desired storage capacities. For example, in order to improve manufacturability, decrease danger of material failure, allow the flywheel 304 to be placed at residences or other small-scale applications, the diameter of the flywheel 304 may range between 6 inches to 36 inches, although other sizes are possible. For example, a flywheel 304 may have a diameter of approximately 25 inches and a thickness of 5-12 inches. As noted elsewhere herein, increasing a quantity of disks may increase an energy storage capacity without increasing rotational speeds.

Although many other implementations are possible and contemplated herein, the flywheel 304 have weights ranging from 100-500 pounds, spin at 5,000-25,000 RPM, and have storage capacities of 3-15 kWh, depending on their sizes and materials. For example, by increasing a diameter or quantity of plates, the flywheel energy capacity may be increased to 15-100 kWh. These and other examples provided herein are meant as non-limiting examples and various sizes, materials, configurations, and storage capacities are possible and contemplated.

Various radiuses and rotational velocities may be used to address radial and circumferential stresses. For instance, decreasing diameters may decrease radial stresses but also decrease angular momentum. As material strengths increase, rotational speeds may be increased to correspondingly increase energy storage. As noted elsewhere herein, the RPM of the flywheel 304 may be monitored by a control unit (e.g., a flywheel controller 254) based on motor 310 speed or one or more sensors, so that the control unit can determine a current energy storage as well as keep the rotation within a target, efficient, or safe speed.

The flywheel 304 may have an aperture through its center where a hub 502 and/or axil 504 may be placed. The hub 502 may include a cylinder coupled to a rod like axil, which, in turn, is coupled with the flywheel coupler 312 or directly coupled with a motor 310, gear, bearing assembly, flywheel bearing 308, or otherwise. The hub 502 may be bolted, glued, welded, or pressure fit to the plates. For instance, during assembly, the hub 502 and plates may be placed together expanded to differing degrees based on temperature or expansion ratios and, when allowed to equalize in temperature, shrink to create tension and gripping force. The disks 510 may be disks or rings around the hub or may be solid at a center and otherwise coupled with the axil 504.

Figure 6A:
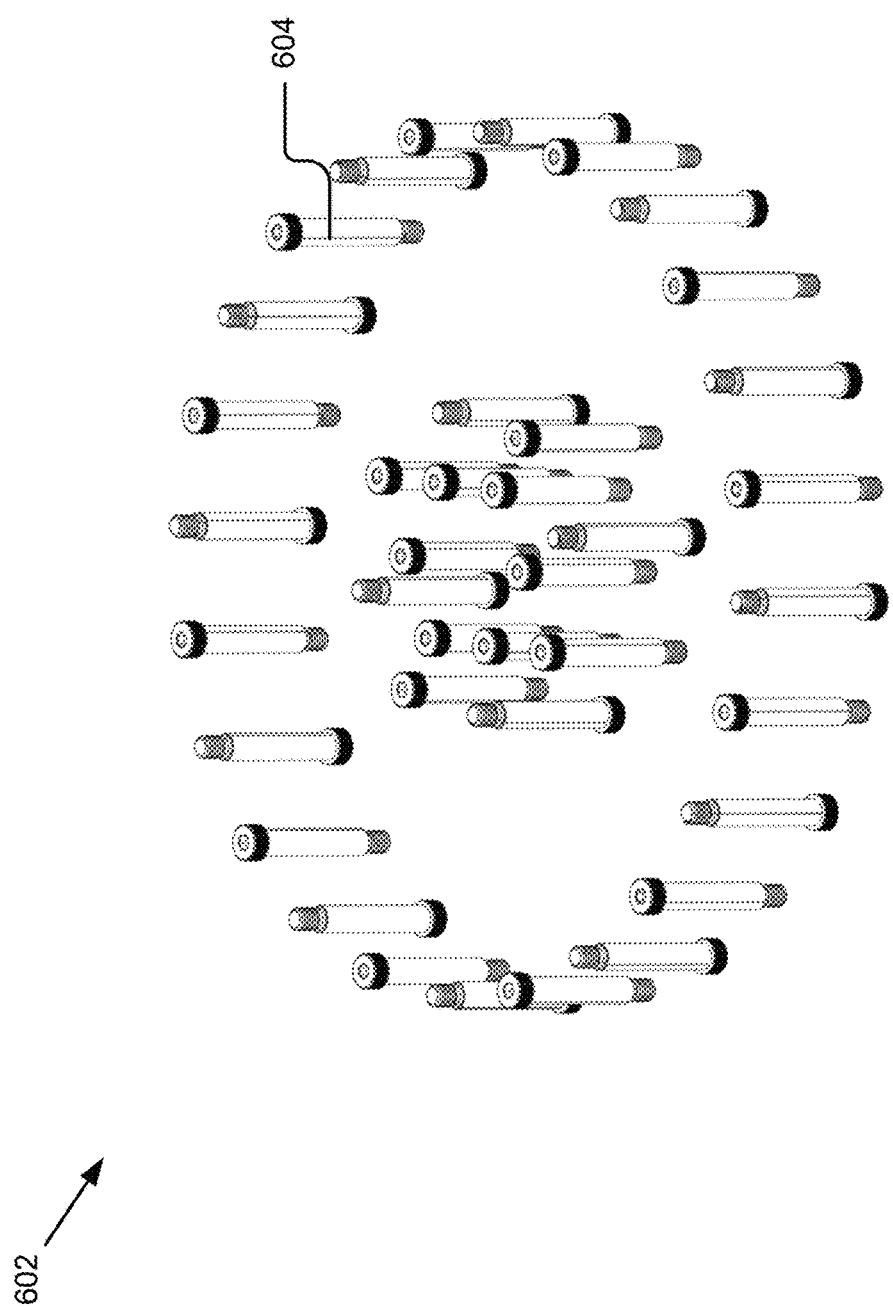
FIG. 6A illustrates an example bolt configuration by which the flywheel disks may be attached together.

Depending on the implementation, the disks of the flywheel 304 may be coupled together by various means, such as glue, hot or cold welding, or fasteners. In some implementations, the disks may be coupled together with fasteners, such as the example bolts illustrated herein. FIG. 6A illustrates an example bolt configuration 602 by which the flywheel disks may be attached together and, potentially, with an axil or other means of coupling the disks to a generator and/or bearing.

FIG. 6A illustrates an example configuration 602 of bolts 604 coupling the flywheel plates, axil, and/or flywheel coupling mechanism 312. The flywheel 304 may include a plurality of bolts around a center, periphery, or otherwise, that rotate around the central axis with the metal plates. The bolts may prevent the metal plates from sliding relative to one another thereby throwing the flywheel 304 out of balance. In some instances, the bolts may provide compressive force on the plurality of disks or plates, which increases friction between the disks and increases stability of the flywheel 304.

In some implementations, the bolts may be adjusted, added, or removed to balance the flywheel 304 vertically and/or horizontally thereby reducing vibrations and risk of structural failure at high RPMs. In some instances, during assembly, a flywheel 304 may be spun at various speeds to detect harmonic frequencies and the bolts, weights, outer diameter of the disks(s) or other features may be adjusted to improve balance. Although other implementations are possible, the bolts may be placed in alternating orientations to improve balance, as illustrated. The bolts may also be tightened in a star or other pattern to balance the forces on the disks.

In some implementations, a plurality of bolts may be positioned around a periphery, such as through perforations in the plates or external to the plates to provide the axial compressive force and/or radial force on the plates. For instance, the bolts may couple a top plate with a bottom plate to pull them or link them together, which may also beneficially allow rotational force to be better communicated with a motor 310 while reducing rotational or radial slippage between plates.

Returning to FIGS. 5A and 5B, the flywheel 304 may be connected to a flywheel coupling 312, which may form or be connected to the axil at the rotational axis to impart rotational force between a motor 310 and a flywheel 304. The flywheel 304 coupling may include a gear, clutch, transmission, magnetic coupling, or other device. For example, as illustrated in the example of FIGS. 5A and 5B, the flywheel coupling 312 may include a magnetic coupling. The flywheel coupling 312 may continuously couple the flywheel 304 with the motor 310 or transmission and/or may be decouplable either electronically or manually.

In the illustrated implementation, the flywheel coupling 312 may include a flywheel component 506 attached to the flywheel 304 and a motor component 508 may be attached to a motor 310 (e.g., directly or via a transmission, gears, belts, etc.). In the depicted example, a motor 310, motor component 508, flywheel component 506, and axil may be axially located along a rotation of axis, which improves reliability and reduces off-axis forces.

For example, as illustrated in the example, a magnetic flywheel coupling 312 may include a bottom member (e.g., a flywheel component 506) coupled with the flywheel 304 and a top member (e.g., a motor component 508), which may be coupled with a generator and/or motor 310. A magnetic flywheel coupling 312 may include radially located, alternating polarity magnets, which resist movement against each other, thereby allowing a torque to be transferred between the generator-motor 310 and the flywheel(s) 304. As illustrated, the top member may sit inside the bottom member of the magnetic flywheel coupling 312 without touching. Accordingly, a force may be applied without mechanical loses and wear and tear, thereby increasing the efficiency of the mechanical-energy storage unit and increasing its useful lifespan. Depending on the implementation, the magnetic flywheel coupling 312 may include one or more bearings (e.g., ball, magnetic, etc.) keeping the top and bottom members aligned.

The components of the flywheel coupling 312 may be couplable or decouplable using various clutch mechanisms, actuators, motors 310, or other devices that press the components towards one another or move them away from one another. In other implementations, the components (e.g., a motor component 508) may include non-permanent magnets or deactivatable (e.g., by alternating magnetic flux with other magnets using a magnetic switch) to allow the components to be decoupled without moving them relative to one another.

In some implementations, a membrane, wall, gasket, or other component may be disposed between the top and bottom portions of the flywheel coupling 312. On the flywheel-side of the partition, a vacuum may be maintained while on the motor 310-side of the partition a vacuum may not be used. In other implementations both halves of the flywheel coupling 312 (and/or the motor 310) may be in or out of a vacuum. For example, a cavity housing the flywheels 304 may be sealed in a vacuum from the factory or a vacuum may be created or maintained using a pump, although other implementations are possible.

It should be noted that although the example flywheel coupling 312 illustrates the magnets as being oriented radially from the rotational axis and the motor component 508 fitting partially inside of the flywheel component 506, other implementations of a magnetic are possible. For instance, the motor component 508 may fit around the flywheel component 506 or each may include a plate facing one another. For instance, the magnets on each component may be axially oriented to interact with one another.

Figure 6B:
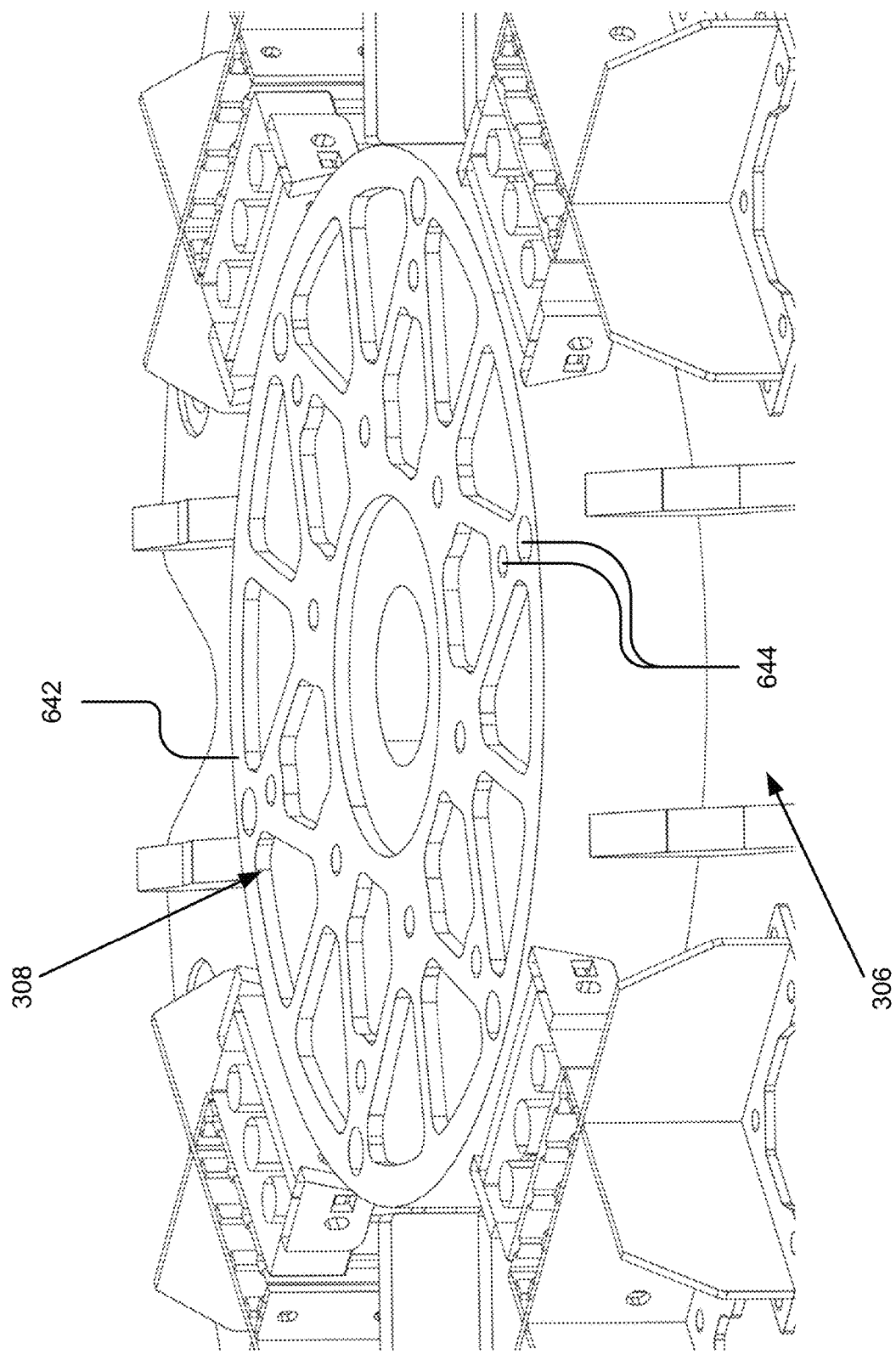
FIGS. 6B and 6C illustrate examples of a flywheel bearing.
Figure 6C:
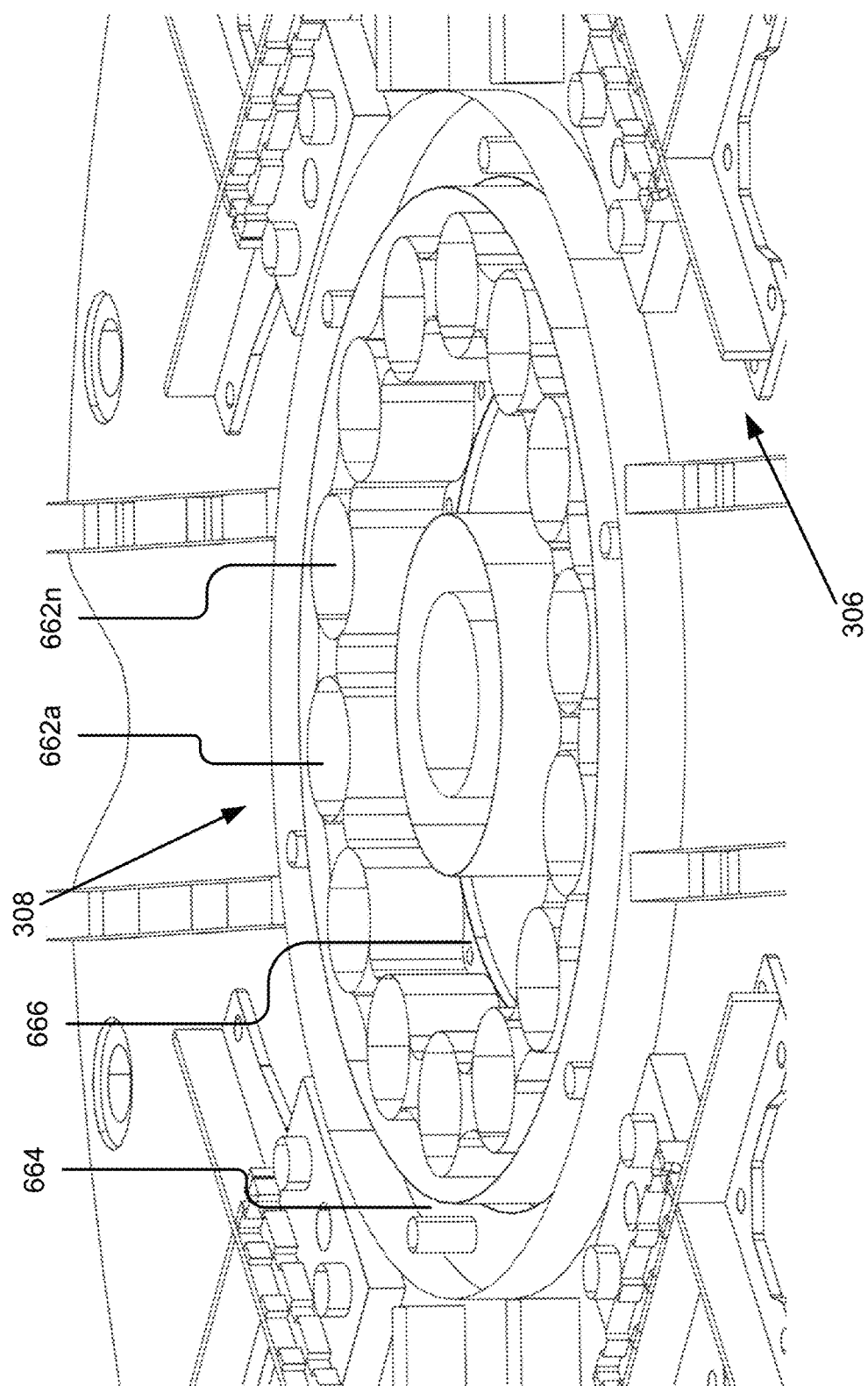
Figure 6D:
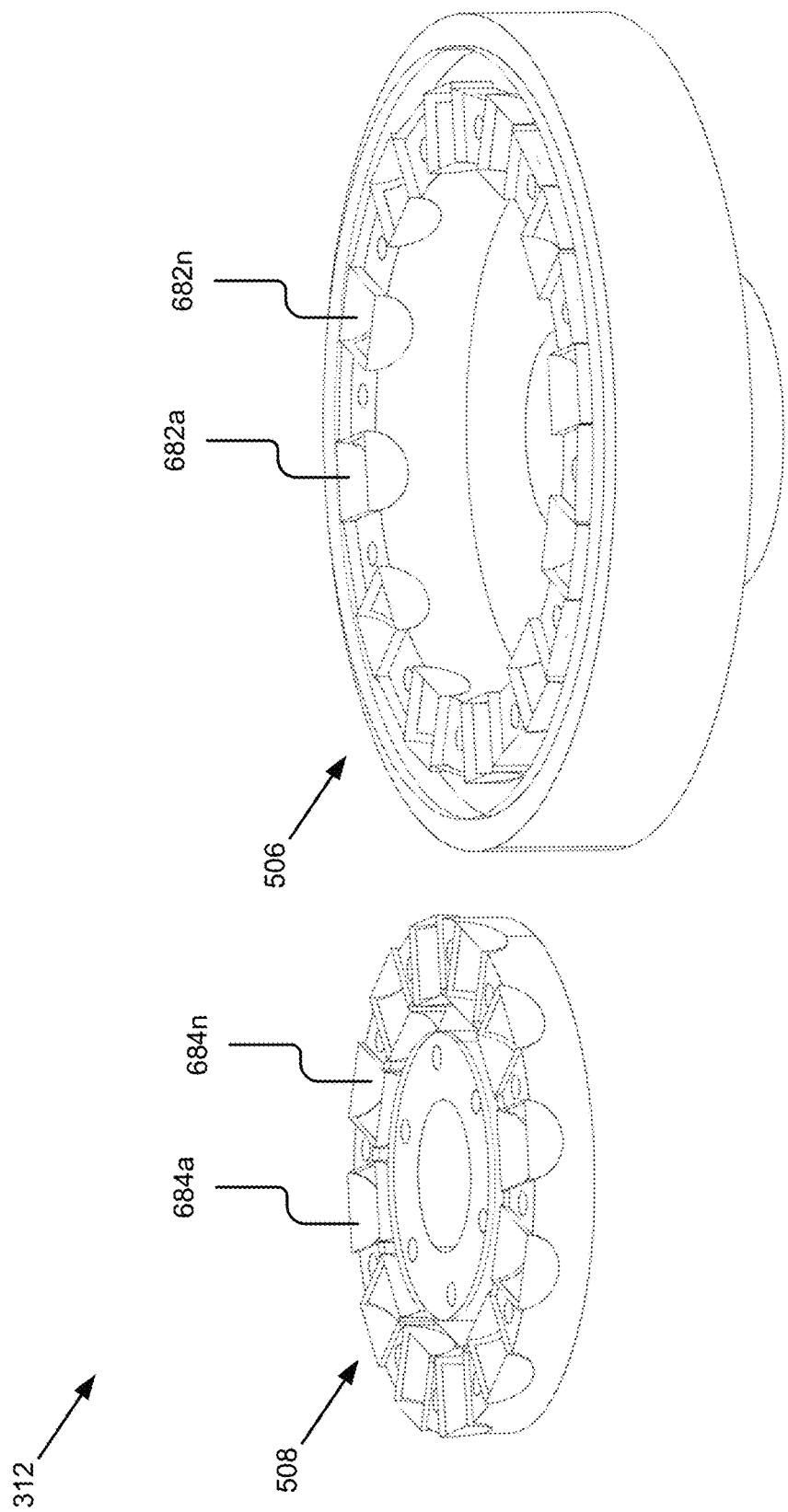
FIG. 6D illustrates an example flywheel coupling.

FIG. 6D illustrates an example flywheel coupling 312 including a motor component 508 and a flywheel component 506 illustrated as a cross section. In the depicted example, the flywheel coupling 312 may include a plurality of magnets 682a . . . 682n and 684a . . . 684n arranged circumferentially around the central axis, which allow the flywheel 304 to be mechanically decoupled from the motor 310 while the flywheel coupling 312 is imparting the rotational force. This mechanical decoupling decreases wear, for example, that would be present on a friction clutch.

For example, the flywheel coupling 312 may include a first plurality of magnets 682a . . . 682n that are oriented so that their polarity or magnetic moment extends radially. The first plurality of magnets 682a . . . 682n may be held by a flywheel coupling 312 body that holds the magnets in place through friction, mechanical forces, or adhesion, for example. As illustrated the flywheel coupling 312 body may include a top half (not shown in FIG. 6D) and a bottom half that clamp over the magnets 682 using fasteners.

The motor component 508 may include a second plurality of magnets 684a . . . 684b that are oriented so that their polarity or magnetic moment extends radially. The first set of magnets 682 may form an outer ring and the second set of magnets 684 may form an inner ring with a smaller diameter where the rings are separated by a space. The quantities of the first and second sets 682 and 684 may be equal and even. The polarity of the magnets may alternate, so that magnetic flux meshes them together and a sheering force may draw them together while allowing them to remain physically disconnected. It should be noted that, in some instances, the magnet moments of each of the sets 682 and 684 may be oriented axially (e.g., vertically when the flywheel is oriented as illustrated).

Returning to FIGS. 3A-3B, the MESU assembly 302 may include a motor 310 that may be coupled with the flywheel(s) 304, for example, at a central axis, hub, or axil, by a flywheel coupling 312. The motor 310 may be housed in a motor 310 housing, a rotor of the motor 310 may be located at the central axis and coupled with the flywheel coupling 312 to rotate with the flywheel 304, although other implementations, such as where belts, gears, pulleys, or other devices for coupling the motor 310 to the flywheel 304 may be used. The motor 310 may serve as a motor 310 to drive the flywheel 304 and/or a generator to receive energy therefrom.

In some implementations, the mechanical-energy storage unit may include or be coupled with a generator-motor 310, which may spin up the flywheel 304 to add energy and receive energy from the flywheel 304 to send energy to an output. The generator-motor 310 may have various configurations and sizes depending on the quantity or total mass of the flywheels 304, a target rotational velocity of the flywheels 304 or generator-motor 310, a target efficiency, a weight rating, or other implementations. The generator-motor 310 may be coupled with various other electronics, such as an electronic control unit that measures the electrical input or output, rotational velocity of the motor 310, health of the system, position of the flywheel coupling 312, position of the generator lifter 316, or other statuses. The electronic control unit may cause electrical current from an external source to be inputted into the flywheel 304 via the generator-motor 310 or outputted via the generator-motor 310. The generator-motor 310 may also include or be coupled to various other electronics, such as inverters, a/c converters, transformers, or other electrical devices.

Alternating current motors or direct current motors may be used, for example, the motor 310 may include a permanent magnet motor 310 or, in order to allow the motor 310 to freely spin, the motor 310 may be an induction motor 310 that allows the motor 310 to freely spin when current is not being applied or received, so that the flywheel 304 can freely spin (e.g., where the flywheel coupling 312 is not decouplable). Other types and configurations of motors are possible and contemplated As illustrated in the examples of FIGS. 3A and 3B, a motor 310 may be mounted to a flywheel housing 306 using a motor 310 frame 314, which may hold the motor 310 to align the axis of rotation of its rotor with the axil of the flywheel 304. In some implementations, the motor 310 frame 314 may be mounted directly to the flywheel housing 306 or it may be mounted via a coupling lifter 316 that may move the flywheel coupling 312 (e.g., a motor component 508) and/or motor 310 to decouple it/them from flywheel 304. For instance, a motor 310 assembly may include a frame 314, motor 310, coupling lifter 316, and/or other components that support the motor 310 and/or flywheel coupling 312.

In some implementations, one or more of the generator-motor 310, motor frame 314, or flywheel coupling 312 (e.g., a top member thereof), may be coupled to the flywheel housing 306 via a coupling lifter 316. For example, a coupling lifter 316 may include a mechanism for decoupling the flywheel coupling 312, thereby allowing the flywheel 304 to spin (e.g., free wheel) with little to no resistance, thereby reducing friction losses and increasing the amount of time energy may be stored for long time periods. The linear actuators may decouple the flywheel coupling 312 by lifting a motor component 508 of the flywheel coupling 312 away from a flywheel component 506 of the flywheel coupling 312.

In some implementations, the coupling lifter 316 may lift both the generator-motor 310 and top portion of the flywheel coupling 312 via the frame, as illustrated in the example of FIG. 3A. Although other implementations are possible, the coupling lifter 316 may include linear actuator, stepper motors attached to threaded rods or leadscrews that lift or lower the generator frame. For example, four coupling lifters 316 are illustrated in the example of FIG. 3A. It should be noted that although the coupling lifter 316 is described as a "lifter" or "lifting" it may decouple the flywheel coupling 312 in various ways, whether moving sideways, downward, upward, or decoupling it by other means, as described elsewhere herein.

In some implementations, as the coupling lifter 316 couples the flywheel coupling 312, the flywheel coupling 312 and/or generator-motor 310 may spin up to the speed of the flywheel 304, thereby reducing jerking or vibration of the system as the flywheel coupling 312 is coupling. In some implementations, the flywheel coupling 312 spinning up may be passive, for example, due to a fluid, friction clutch, or magnetic coupling interacting. For instance, as the magnets of the top member and bottom member of the flywheel coupling 312 are brought into proximity, the magnetic force may naturally gradually bring the couplings to the same speed. In some implementations, the speed matching may be performed or assisted using electrical current applied to the generator motor 310 to spin it up to speed (e.g., based on a sensor measuring a speed of the flywheel 304).

Returning to FIGS. 3A-3B, the flywheel 304 may be housed in a flywheel housing 306, which may be a steel, aluminum, glass, plastic, composite or other housing for providing support to the flywheel(s) 304. For instance, the flywheel housing 306 may include a metal (e.g., aluminum or steel) plate on the top of the flywheel 304, a metal plate on the bottom of the flywheel 304, various reinforcing members, and housing supports for coupling the top and bottom plates. In some implementations, the top metal plate, or other components of the flywheel housing 306, which is near moving magnets (e.g., of the generator-motor 310, flywheel coupling 312, or flywheel bearing 308) may be constructed from plexiglass or another non-conductive material to reduce induced eddy currents and associated inefficiencies.

Figure 6E:
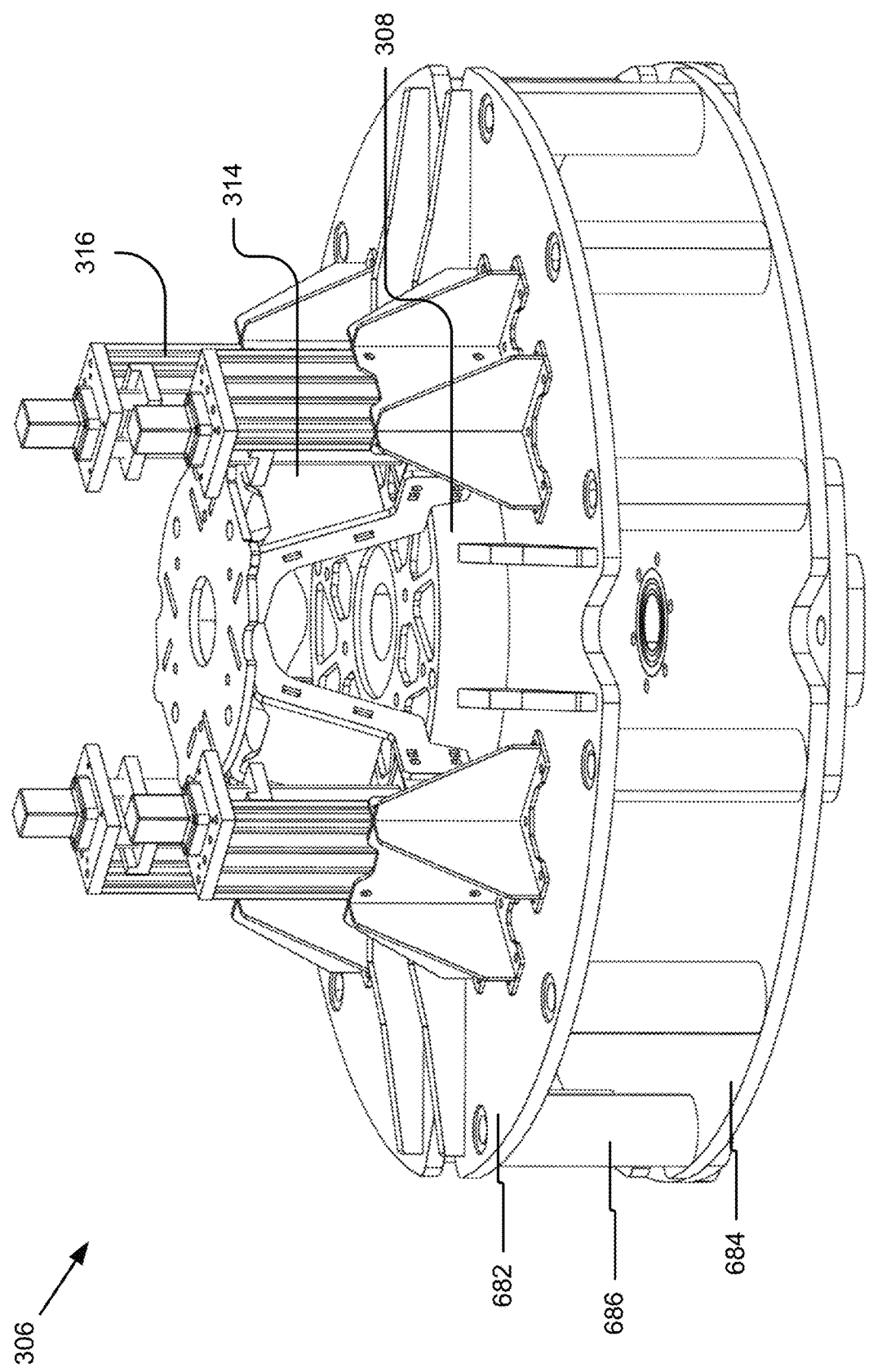
FIG. 6E illustrates an example flywheel housing.

FIG. 6E illustrates an example flywheel housing 306 with motor 310 frame 314, coupling lifter 316, and flywheel bearing 308. The flywheel housing 306 may include top structure 682, a bottom structure 684, and one or more support members 686 coupling the top structure 682 and the bottom structure 684 together and providing a cavity between the top structure 682 and the bottom structure 684 where the flywheel 304 may be located when housed in the housing. In some implementations, the flywheel housing 306 may include legs, mounting brackets, and/or bushings for coupling the flywheel housing 306 to an external structure, such as a case, cement foundation, or otherwise.

In some implementations, the top structure 682 may include a steel, aluminum, composite, or other plate or other structure to which other components, such as the frame 314, coupling lifter(s) 316, flywheel bearing 308, or other components may be mounted. In some implementations, the top structure 682 may also include various ribs or other structures that further reinforce the top structure 682. In some implementations, the top structure 682 (and/or bottom structure 684) may be non-conductive or may have breaks in the conductive material to reduce eddy currents generated by a magnetic flywheel coupling 312 or flywheel bearing 308.

The bottom structure 684 may include a bottom plate similar to the top plate but with mounting points for legs or other structures that mount the flywheel housing 306 to an external structure, although other components of the housing may also be externally attached. For instance, as noted elsewhere herein, the bottom structure 684 may include legs, brackets, and/or bushings for coupling it to an external structure and/or reducing transmitted vibrations. The bottom structure 684 and/or the legs may include levels or leveling mechanisms that allow the flywheel housing 306 to be leveled.

The one or more support members 686 may include vertical braces attaching the top structure 682 to the bottom structure 684. The support members 686 may be positioned around a perimeter of the flywheel 304 and include bolts, welds, or other fastening mechanisms that couple the components together. The support members 686 may be reinforced to mitigate external damage due to a structural failure of the flywheel 304. Although the support members 686 are illustrated as discrete posts, they may be, include, or be coupled to a continuous structure enclosing a cavity, which may be an actively maintained or permanent vacuum in which the flywheel 304 spins.

It should be noted that other implementations are possible and contemplated herein, such as where the flywheel housing 306 is integrated into a case or enclosure. The length or size of the housing supports 686 may be set to provide strength to the mechanical-energy storage unit while accommodating various quantities of flywheels 304/flywheel disks.

In some implementations, the flywheel housing 306 may be enclosed by one or more walls. For example, in some implementations, the flywheel housing 306 may be sealed, so that the flywheel 304 is held within a vacuum, thereby increasing the efficiency of the flywheel 304. In some instances, the entire mechanical-energy storage unit may be held within a vacuum, for example, in an external case.

Depending on the implementation, the flywheel housing 306 and/or case may be reinforced to prevent exterior damage in the case where one or more of the flywheel disks fails, for example, due to being spun too quickly. In some instances, to prevent excess speed in the flywheel 304, a mechanical and/or electrical system may decouple the flywheel 304 from power being inserted into the flywheel 304, e.g., by decoupling the flywheel coupling 312 or electronically removing a connection to an external power supply, as described below.

In some implementations, the mechanical-energy storage unit may include support legs (e.g., 318 illustrated in FIG. 3A) coupled to the flywheel housing 306. The support legs may couple the flywheel housing 306 to the ground and/or to a case, although other implementations are possible. In some instances, the support legs may include rubber or other decoupling mechanisms to prevent vibration transfer to/from the mechanical-energy storage unit and/or flywheel(s) 304.

In some implementations, the flywheel housing 306 may be mounted within or integrated with a case or enclosure (not shown), which may be a cylinder, box, hexagonal prism, or of another shape or configuration. The flywheel 304 or MESU assembly 302 may be placed inside the case, which may be bolted to cement, buried under ground, or otherwise placed in a safe or quiet location. In some implementations, the case may be sealed so that a full or partial vacuum may be maintained therein, although other implementations are possible.

The case may hold various shapes or sizes to house various configurations of mechanical-energy storage assemblies. For example, a case or enclosure may be octagonal, round, square, or another shape. The case may be constructed from stainless steel, aluminum, plexiglass, concrete, or other material that is strong (e.g., to retain a mechanical flywheel 304 failure) or may be buried underground. In some implementations, a top of the case may be a clear panel via which visual checks can be performed thereby reducing maintenance. The case may also include various apertures via which cables, pipes, or other devices may pass.

Returning to FIGS. 3A-3B, the MESU assembly 302 may include a flywheel bearing 308 integrated with or coupled with the flywheel housing 306 and providing vertical and/or horizontal support to the flywheel 304. Depending on the implementation, the flywheel bearing 308 may include fluid, magnetic levitation, ball bearings (e.g., ceramic or ceramic hybrid), Teflon®, and/or other bearings. For instance, the flywheel bearing 308 may use a first type of bearing (e.g., ball bearings) horizontally and a second type of bearing (e.g., magnetic levitation) vertically. In other implementations, the flywheel bearing 308 may be completely based on magnetic levitation. The quantity, type, and spacing of magnets in either side of a magnetic levitation bearing may be based on a total mass of the flywheel(s) 304 and/or other spinning structure.

In some implementations, the flywheel bearing 308, such as a magnetic levitation bearing, may be imposed on a center axis (e.g., an axil or hub) of the flywheel 304. The flywheel bearing 308 may be only on the top, only on the bottom, or on both the top and bottom of the flywheel(s) 304. For example, as illustrated the flywheel bearing 308 may include a magnetic levitation bearing housed in a housing that may be coupled with the flywheel housing 306. The bearing housing may have magnets preloaded from the factory so that the bearing housing can be installed or replaced (e.g., with other strength bearings based on a total weight of a quantity of flywheel plates) without installers or maintenance workers encountering the danger of strong magnets, such as neodymium magnets.

FIGS. 6B and 6C illustrate examples of a flywheel bearing 308, according to some implementations. For example, FIG. 6B illustrates a detail view of an example flywheel bearing body that is coupled with a flywheel housing 306 and FIG. 6C illustrates a cross section view of an example flywheel bearing 308.

As illustrated in FIG. 6B, the flywheel bearing 308 may include a bearing body 642 in which one or more of bearings. As illustrated, the flywheel bearing body 642 may be attached to a flywheel housing 306 at a center thereof. In some instances, during manufacturing, the bearing body 642 may be pre-assembled either separately or as part of the flywheel housing 306. For instance, during shipping, the flywheel bearing 308 may be in a shipping position or may otherwise be adjustable for during use of the flywheel 304. Depending on the implementation, the bearing body 642 may include one or more bolts, screws, or other devices for locking, unlocking, or adjusting the bearings. As illustrated, the bearing body 642 may include one or more apertures 644a . . . 644n through which bolts or other devices may lock or adjust the flywheel bearing 308. For example, a bolt may adjust a magnetic levitating bearing (e.g., magnets thereof) into a more or less ideal position.

In some implementations, the flywheel bearing 308 may include one or more magnets that magnetically levitate the flywheel 304 vertically and/or one or more ball bearings that position the flywheel horizontally, although other types and configurations are possible and contemplated.

In the cross section of FIG. 6C, the example flywheel bearing 308 includes a plurality of magnets 662a . . . 662n arranged around the flywheel bearing 308 in a circle. These magnets may have a common magnetic moment or polarity to interact with corresponding magnets (e.g., on an opposing part of the flywheel bearing 308, such as on a flywheel side or housing side) having an opposite polarity to levitate the flywheel 304. The magnets 662 may be attached to one or more disks 664 and 666 that may be leveled or otherwise moved by bolts through the bearing body 642, as noted above. Accordingly, the flywheel bearing 308 may be pre-loaded before a flywheel 304 is attached and/or may be adjusted during installation or maintenance, for instance.

While the flywheel bearing 308 is primarily described in reference to an upper flywheel bearing 308, the MESU assembly 302 may include a plurality of flywheel bearings 308 or flywheel bearing 308 components. For instance, a flywheel bearing 308 and/or flywheel bearing component may be located at a top of the flywheel 304, a bottom of the flywheel 304, or both. In some implementations, a vertical (e.g., maglev) component of the flywheel bearing 308 may be located at a top while a horizontal (e.g., ceramic ball bearing) may be located at a top and/or bottom of the flywheel 304 and flywheel housing 306.

Although not visible in FIG. 6C, the flywheel bearing 308 may include one or more horizontal bearings, which may include ball bearings or otherwise, such as ceramic ball bearings positioning the flywheel 304 horizontally. For example, a maglev bearing may support the weight of the flywheel 304 while a horizontal ceramic bearing supports less weight and therefore experiences less wear by keeping the flywheel 304 position at an axis of rotation. Additionally, or alternatively, various lubricants may be used or the bearings may be dry. Where lubricants are used and the MESU assembly 302, flywheel bearing 308, flywheel housing 306, and/or flywheel 304 are located in a vacuum, a vacuum compatible lubricant may be used to provide lubrication and/or avoid spontaneous welding of metal surfaces.

Figure 4A:
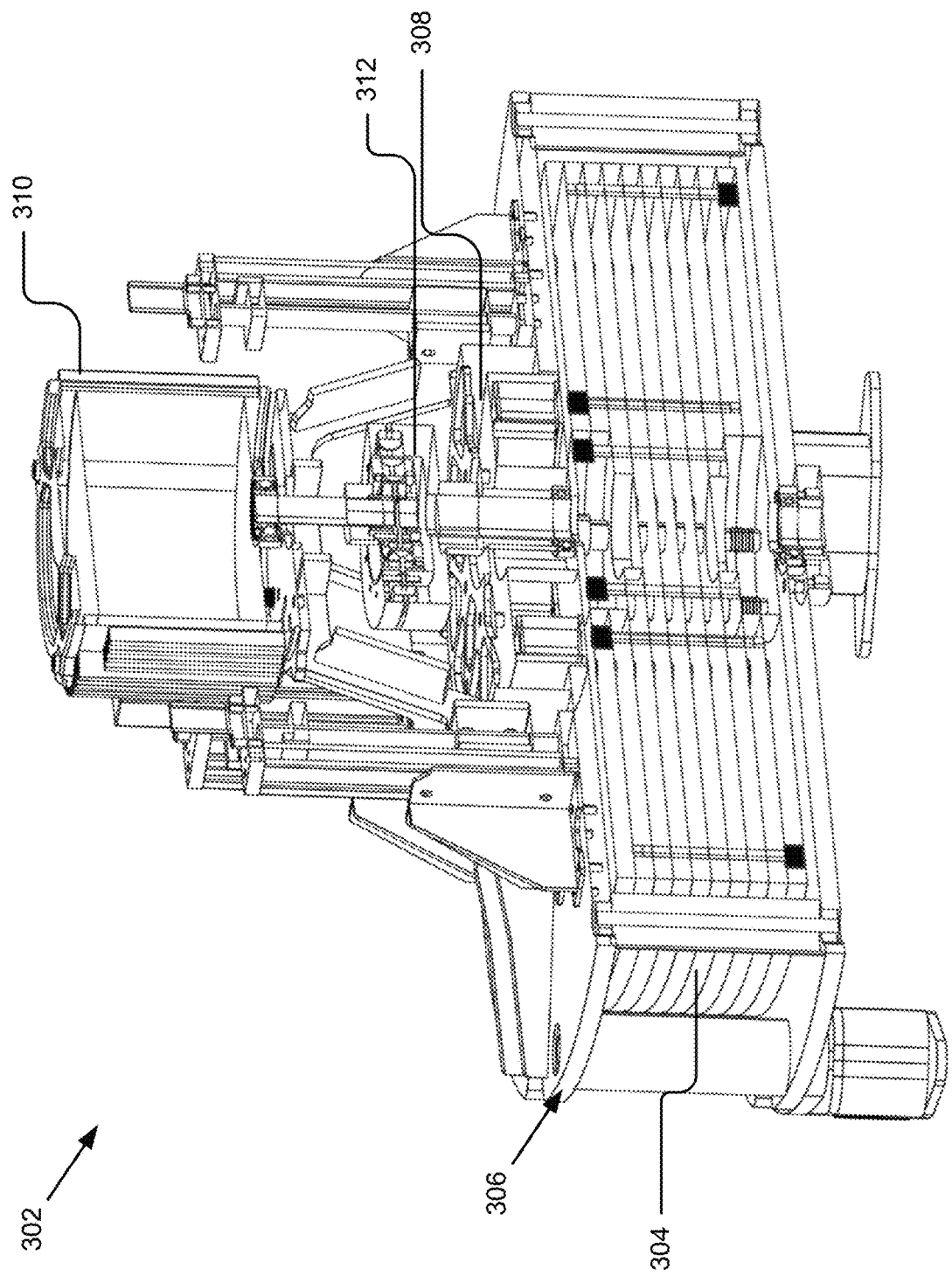
FIGS. 4A and 4B illustrate cross sections of an example mechanical-energy storage unit assembly.
Figure 4B:
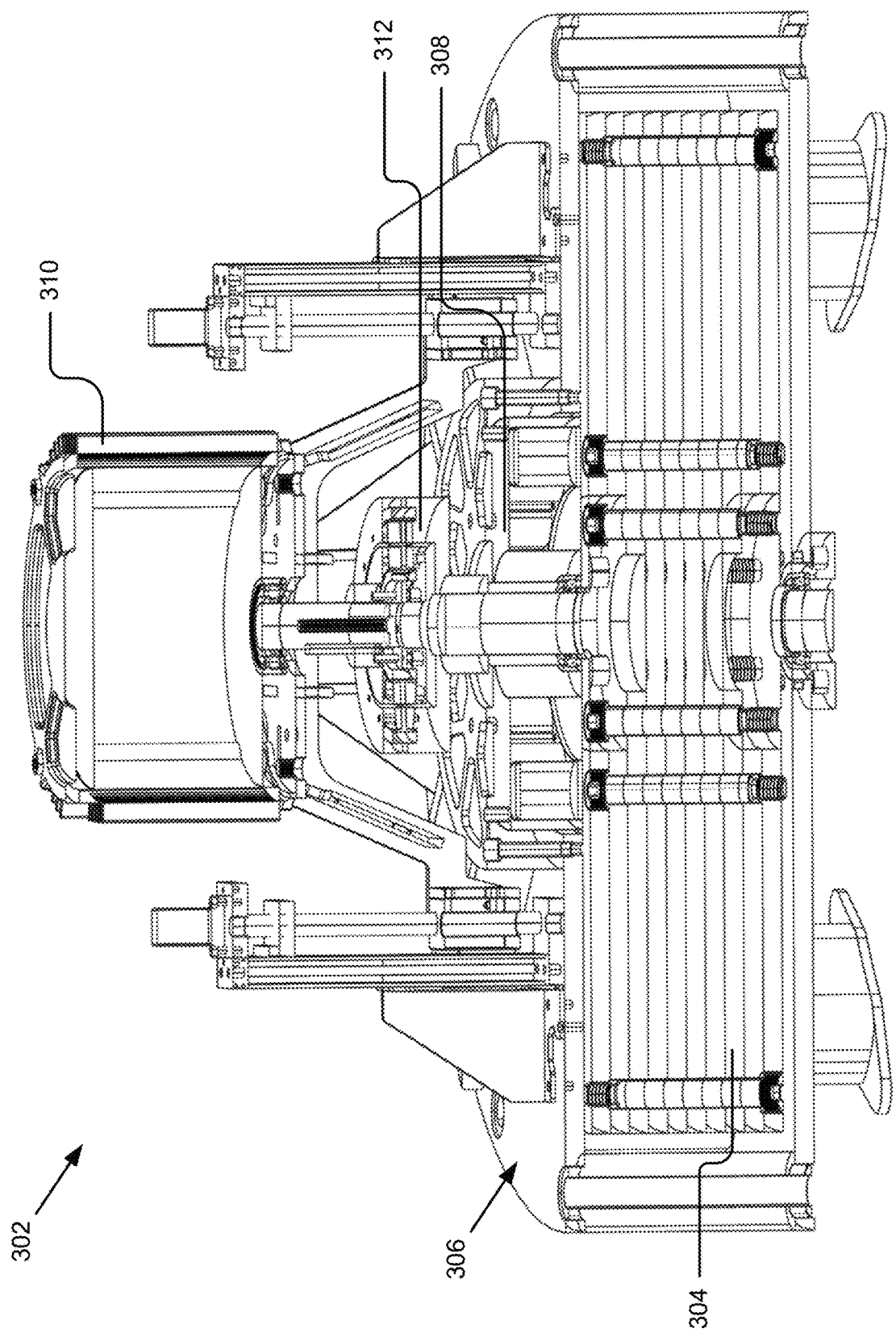

FIG. 4A illustrates a cross section of a perspective view of an example MESU assembly 302, and FIG. 4B illustrates a cross section of a side view of an example MESU assembly 302. Various components in described in reference to the other figures herein can also be seen in reference to FIGS. 4A and 4B. It should be noted that although an example configuration of the generator-motor 310, flywheel coupling 312, and flywheel 304 are illustrated, other implementations are possible and contemplated herein. For instance, a generator-motor 310 and/or flywheel coupling 312 may be disposed below the flywheel(s) 304 and lifted into place by the coupling lifter 316. It should be noted that the interior structure of the motor 310 is no illustrated in FIGS. 4A and 4B.

Although not illustrated in the examples of FIGS. 3A-4B, other components and features may be included. For example, sensors for detecting a velocity of the flywheel(s) 304 or motor 310, temperature of the system, maintaining or measuring a vacuum, communicating with external systems, and/or providing control of the system may also be included.

Figure 7:
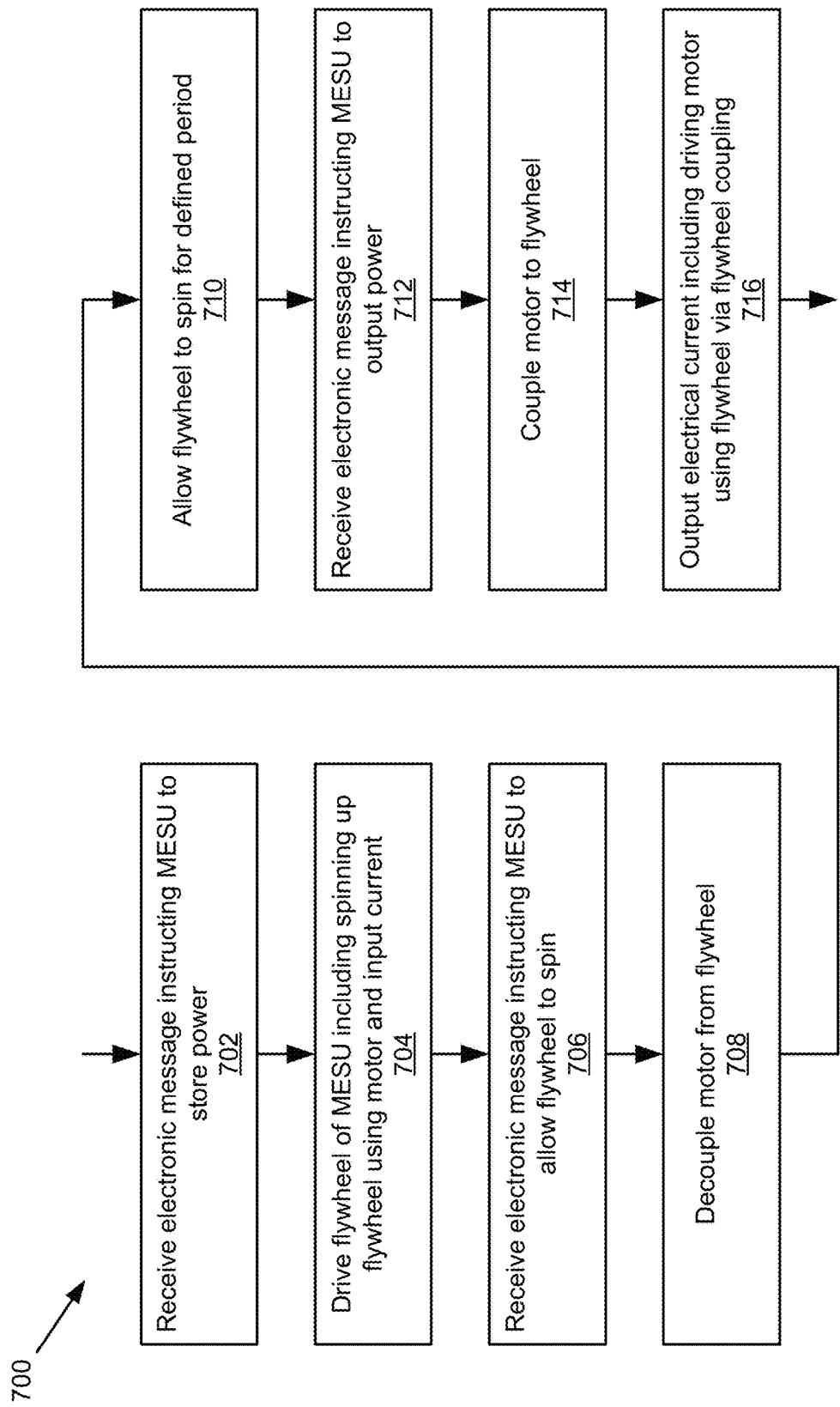
FIG. 7 is a block diagram illustrating an example method for operating a mechanical-energy storage unit assembly to store and retrieve energy.

FIG. 7 is a block diagram illustrating an example method 700 for operating a MESU assembly 302 to store and retrieve energy. It should be noted that it may be used with the features and technologies described herein or otherwise. The method 700 is described as being performed by a flywheel controller 254, but it may be performed by one or more other components, control units, processors, or automated systems. As noted above, the flywheel controller 254 may include one or more processors, computer memories, communication units, and interfaces that allow it to perform operations responsive to an internal program or signals received from other devices, such as a utility server 120, EaaS manager 110, a mobile application, a local controller, or based on input from various sensors, such as current sensors indicating current being received or requested, rotational frequency sensors monitoring a flywheel 304 or motor 310, or other devices. The flywheel controller 254 or other control unit may be powered by the flywheel 304, by a battery, or by another external power source.

At 702, the flywheel controller 254 may receive an electronic message instructing the MESU to store power. The message may be received or generated by the flywheel controller 254, for example, based on an excess voltage or current received or based on a message from a controlling application, such as the EaaS manager 110 or node application 240, as described above. For instance, a user may select store energy on a node application 240 or the node application 240 may detect that there is excess solar production at a solar electric system 144, in response to which, it may determine to store power at the MESU.

At 704, the flywheel controller 254 may drive a flywheel 304 of the MESU including spinning up the flywheel 304 using a motor 310 and an input current driving the motor 310, for example, based on the received electronic message. For instance, the flywheel controller 254 may actuate an electronic or physical switch that directs a current to the motor 310 to spin the flywheel 304 up. The flywheel controller 254 may drive it up to a set speed and/or input a defined power into the flywheel 304.

At 706, the flywheel controller 254 may receive an electronic message instructing the mechanical-energy storage unit to allow the flywheel 304 to spin. For instance, in response to a determination that the flywheel 304 has reached its target speed or storage capacity, or in response to another determination, the flywheel controller 254 may determine to allow the flywheel 304 to spin freely.

At 708, the flywheel controller 254 may decouple the motor 310 from the flywheel 304 using the flywheel coupling 312 based on the third electronic message. For instance, the flywheel controller 254 may instruct an induction motor to spin freely or a flywheel 304 coupling to decouple. For instance, the flywheel coupling 312 may include a clutch and/or a magnetic coupling, as described above. Decoupling the motor 310 from the flywheel 304 may include actuating a linear actuator that moves a motor component 508 of the flywheel coupling 312 away from a flywheel component 506 of the flywheel coupling 312, which allows the flywheel 304 to spin freely. As noted elsewhere herein, other implementations are possible and contemplated herein.

At 710, the flywheel controller 254 may allow the flywheel 304 to spin, for example, for a defined time period, for example, until the energy is used or another signal is received indicating to output power.

At 712, the flywheel controller 254 may receive an electronic message instructing the MESU to output power. For instance, as with the operations at 702 or 706, the flywheel controller 254 may determine or be instructed to output electrical power via from the MESU. The determination to output power may be based on a detected voltage or electrical demand, a set schedule (e.g., programmed based on a time of day), or based on another condition or signal.

At 714, the flywheel controller 254 may couple the motor 310 to the flywheel 304, for example, via the flywheel coupling 312. For instance, the flywheel controller 254 may actuate the flywheel coupling 312 to couple the motor-generator 310 to the flywheel 304 and generate electrical current based thereon. In some implementations, in coupling the flywheel coupling 312, the speed of the flywheel component 506 may be matched to a motor component 508 of the flywheel coupling 312 while coupling the components.

The speed matching may be active where a speed of the flywheel 304 is computed (e.g., based on a previously known RPM, elapsed time, and predicted rate of deceleration) or sensed using a sensor and the flywheel controller 254 may instruct the motor 310 to spin to the corresponding speed while coupling in order to reduce jerking or friction.

In some implementations, the speed may be matched passively. For example, as magnets on each component of the flywheel coupling 312 get closer, they may passively match speeds.

At 716, the flywheel controller 254 may output an electrical current including driving the motor(s) 310 using the flywheel 304 via the flywheel coupling 312, for example, based on the received electronic message. For example, the flywheel controller 254 may use the motor-generator 310 to slow the flywheel 304 and thereby generate a current, which may be used or transmitted to an external load.

It should be noted that other implementations and operations are possible and contemplated, for example, where a mechanical-energy storage system may include a flywheel 304 constructed from a steel or aluminum core with composite wheel on the radially outward portions, thereby allowing the flywheel 304 to spin at faster speeds without failure. Additional mechanical-energy storage units may be stacked and coupled (e.g., within a single case), thereby increasing storage capacity.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A mechanical-energy storage unit assembly comprising:
   a flywheel including one or more plates and coupled at a central axis of rotation to a flywheel bearing, the flywheel being adapted to rotate about the central axis;
   a flywheel housing providing vertical support to the flywheel bearing;
   the flywheel bearing coupling the flywheel to the flywheel housing;
   a motor assembly including a motor-generator adapted to convert an input electrical current to rotational momentum by spinning up the flywheel, the motor-generator further being adapted to convert the rotational momentum of the flywheel into an output electrical current, the motor assembly including a frame coupling the motor-generator to the flywheel housing and adapted to support the motor-generator along the central axis from a flywheel coupling; and the flywheel coupling adapted to couple the motor assembly with the flywheel and impart rotational force between the motor-generator and the flywheel.

2. The mechanical-energy storage unit assembly of claim 1, wherein:
the one or more plates include a plurality of metal plates stacked together.

3. The mechanical-energy storage unit assembly of claim 2, wherein:
the flywheel includes a plurality of bolts that rotate around the central axis with the plurality of metal plates; and
the plurality of bolts adapted to provide compressive force on the plurality of metal plates, the compressive force increasing friction between the plurality of metal plates.

4. The mechanical-energy storage unit assembly of claim 1, wherein:
the flywheel housing includes a top structure, a bottom structure, and one or more support members coupling the top structure and the bottom structure together and providing a cavity between the top structure and the bottom structure, the flywheel being located in the cavity when housed by the flywheel housing;
the flywheel bearing is coupled with the top structure; and
the flywheel housing includes one or more bushings coupling the flywheel housing to an external structure.

5. The mechanical-energy storage unit assembly of claim 1, wherein:
a rotor of the motor-generator is located at the central axis and coupled with the flywheel coupling to rotate with the flywheel.

6. The mechanical-energy storage unit assembly of claim 1, wherein the flywheel coupling imparting the rotational force between the motor-generator and the flywheel includes:
a plurality of magnets arranged circumferentially around the central axis, the flywheel coupling being adapted to allow the flywheel to be mechanically decoupled from the motor-generator while the flywheel coupling is imparting the rotational force.

7. The mechanical-energy storage unit assembly of claim 6, wherein:
the flywheel coupling includes a flywheel component coupled with the flywheel and a motor component coupled with the motor-generator, the flywheel component interacting with the motor component using magnetic flux to impart force on the motor component;
the flywheel component includes a first plurality of magnets in the flywheel component and located radially relative to the central axis; and
the motor component includes a second plurality of magnets in the motor component and located radially relative to the central axis.

8. The mechanical-energy storage unit assembly of claim 7, wherein:
the first plurality of magnets are polarized in a radial direction outward from the central axis, a magnetic moment of each of the first plurality of magnets being oriented in an alternating direction from an adjacent magnet of the first plurality of magnets; and
the second plurality of magnets are polarized in the radial direction outward from the central axis, a magnetic moment of each of the second plurality of magnets being oriented in an alternating direction from an adjacent magnet of the second plurality of magnets.

9. The mechanical-energy storage unit assembly of claim 1, wherein:
the flywheel coupling is connected to a control unit, the control unit electronically decoupling the flywheel coupling based on a received electronic signal.

10. The mechanical-energy storage unit assembly of claim 9, wherein:
the flywheel coupling is coupled with one or more linear actuators, the one or more linear actuators adapted to decouple the flywheel coupling by lifting a motor component of the flywheel coupling away from a flywheel component of the flywheel coupling.

11. The mechanical-energy storage unit assembly of claim 10, wherein:
the one or more linear actuators are further adapted to decouple the flywheel coupling by lifting the motor-generator away from the flywheel component of the flywheel coupling.

12. The mechanical-energy storage unit assembly of claim 1, wherein the flywheel bearing includes:
one or more magnets that magnetically levitate the flywheel vertically; and
one or more ball bearings that position the flywheel horizontally.

13. The mechanical-energy storage unit assembly of claim 1, wherein:
the flywheel housing includes a vacuum chamber, the flywheel being located within the vacuum chamber.

14. The mechanical-energy storage unit assembly of claim 1, wherein:
the flywheel bearing includes a bolt that adjusts one or more magnets.

15. The mechanical-energy storage unit assembly of claim 1, further comprising a mechanical-energy storage unit control system coupled with the motor-generator and the flywheel coupling, the mechanical-energy storage unit control system including one or more processors adapted to execute instructions that cause the mechanical-energy storage unit assembly to:
receive a first electronic message instructing the mechanical-energy storage unit assembly to receive the input electrical current;
apply the input electrical current from one or more external circuits to the motor-generator that causes the motor-generator to impart rotational force that increases the rotational momentum of the flywheel based on the first electronic message;
allow the flywheel to spin for a defined time period including:
receiving, by the one or more processors, a second electronic message instructing the mechanical-energy storage unit control system to allow the flywheel to spin; and
based on the second electronic message, decoupling, by the one or more processors, the motor-generator from the flywheel using the flywheel coupling;
receive a third electronic message instructing the mechanical-energy storage unit control system to transfer the rotational momentum to an output electrical current; and
cause the motor-generator to receive rotational force from the flywheel, the motor-generator converting the rotational momentum into the output electrical current and outputting the output electrical current to the one or more external circuits based on the third electronic message.

16. A computer-implemented method for controlling a mechanical-energy storage unit comprising:
receiving, by one or more processors, a first electronic message instructing the mechanical-energy storage unit to receive an input electrical current;
applying, by the one or more processors, the input electrical current from one or more external circuits to a motor-generator that causes the motor-generator to impart rotational force that increases a rotational momentum of a flywheel of the mechanical-energy storage unit based on the first electronic message, the flywheel including a plurality of metal plates coupled with the motor-generator using a flywheel coupling;
allowing, by the one or more processors, the flywheel to spin for a defined time period including:
receiving, by the one or more processors, a second electronic message instructing the mechanical-energy storage unit to allow the flywheel to spin; and
based on the second electronic message, decoupling, by the one or more processors, the motor-generator from the flywheel using the flywheel coupling;
receiving, by the one or more processors, a third electronic message instructing the mechanical-energy storage unit to transfer the rotational momentum to an output electrical current; and
causing, by the one or more processors, the motor-generator to receive rotational force from the flywheel, the motor-generator converting the rotational momentum into the output electrical current and outputting the output electrical current to the one or more external circuits based on the third electronic message.

17. The computer-implemented method of claim 16, wherein:
decoupling the motor-generator from the flywheel includes actuating a linear actuator to move a motor component of the flywheel coupling away from a flywheel component of the flywheel coupling.

18. A mechanical-energy storage unit assembly comprising:
a flywheel including one or more plates and coupled at a central axis of rotation to a flywheel bearing, the flywheel being adapted to rotate about the central axis;
a flywheel housing providing vertical support to the flywheel bearing;
the flywheel bearing coupling the flywheel to the flywheel housing;
a motor assembly including a motor-generator adapted to convert an input electrical current to rotational momentum by spinning up the flywheel, the motor-generator further being adapted to convert the rotational momentum of the flywheel into an output electrical current; and
a flywheel coupling adapted to couple the motor assembly with the flywheel and impart rotational force between the motor-generator and the flywheel, the flywheel coupling being adapted to allow the flywheel to be mechanically decoupled from the motor-generator while the flywheel coupling is imparting the rotational force, the flywheel coupling including a plurality of magnets arranged circumferentially around the central axis, the flywheel coupling including a flywheel component coupled with the flywheel and a motor component coupled with the motor-generator, and wherein:
the flywheel component interacts with the motor component using magnetic flux to impart force on the motor component, the flywheel component including a first plurality of magnets in the flywheel component and located radially relative to the central axis, the first plurality of magnets being polarized in a radial direction outward from the central axis, a magnetic moment of each of the first plurality of magnets being oriented in an alternating direction from an adjacent magnet of the first plurality of magnets; and
the motor component includes a second plurality of magnets in the motor component and located radially relative to the central axis, the second plurality of magnets being polarized in the radial direction outward from the central axis, a magnetic moment of each of the second plurality of magnets being oriented in an alternating direction from an adjacent magnet of the second plurality of magnets.

19. The mechanical-energy storage unit assembly of claim 18, wherein:
the flywheel housing includes a top structure, a bottom structure, and one or more support members coupling the top structure and the bottom structure together and providing a cavity between the top structure and the bottom structure, the flywheel being located in the cavity when housed by the flywheel housing; and
the flywheel bearing is coupled with the top structure.

20. The mechanical-energy storage unit assembly of claim 19, wherein the flywheel bearing includes:
one or more magnets that magnetically lift the flywheel vertically; and
one or more ball bearings that position the flywheel horizontally.

* * * * *